(12) United States Patent
Lee

(10) Patent No.: US 9,595,132 B2
(45) Date of Patent: Mar. 14, 2017

(54) METHODS AND APPARATUSES OF LENS FLARE RENDERING USING LINEAR PARAXIAL APPROXIMATION, AND METHODS AND APPARATUSES OF LENS FLARE RENDERING BASED ON BLENDING

(71) Applicant: RESEARCH & BUSINESS FOUNDATION SUNGKYUNKWAN UNIVERSITY, Suwon-si (KR)

(72) Inventor: Sung Kil Lee, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 149 days.

(21) Appl. No.: 14/307,702

(22) Filed: Jun. 18, 2014

(65) Prior Publication Data

US 2015/0070375 A1  Mar. 12, 2015

(30) Foreign Application Priority Data

Sep. 10, 2013 (KR) .................. 10-2013-0108389
Jun. 17, 2014 (KR) .................. 10-2014-0073605

(51) Int. Cl.
*G06T 15/50* (2011.01)

(52) U.S. Cl.
CPC .................. *G06T 15/50* (2013.01)

(58) Field of Classification Search
CPC .................................. H04N 1/0423
See application file for complete search history.

(56) References Cited

U.S. PATENT DOCUMENTS 7,526,417 B1 * 4/2009 Alspach ............... G06T 15/50
703/6

FOREIGN PATENT DOCUMENTS

JP    11-355636 A    12/1999
JP    2013-55566 A    3/2013

OTHER PUBLICATIONS

Hullin et al. "Physically-based real-time lens flare rendering." ACM Transactions on Graphics (TOG)—Proceedings of ACM SIG-GRAPH 2011 TOG Homepage. vol. 30 Issue 4, Jul. 2011. Article No. 108.*
Lee, Sungkil, et al. "Practical Real-Time Lens-Flare Rendering." Computer Graphics Forum. vol. 32. No. 4. Blackwell Publishing Ltd, Jun. 19, 2013 (7 pages, in English).
Korean Office Action issued on Dec. 22, 2015 in counterpart Korean Application No. 10-2014-0073605 (4 pages in Korean).
Korean Notice of Allowance issued on Aug. 19, 2016 in counterpart Korean Application No. 10-2014-0073605. (6 pages in Korean).

* cited by examiner

*Primary Examiner* — Antonio A Caschera
(74) *Attorney, Agent, or Firm* — NSIP Law

(57) ABSTRACT

A lens flare generation method and apparatus simulates lens flare effects through paraxial approximation-based linear approximation to generate a lens flare utilizing physical characteristics of a lens system while generating a lens flare at high speed. A non-linear effect may be added to a linear pattern-based lens flare effect to generate an actual lens flare reflecting most of physical characteristics generated from the lens system. A pre-recorded non-linear pattern may be used.

20 Claims, 21 Drawing Sheets

METHODS AND APPARATUSES OF LENS FLARE RENDERING USING LINEAR PARAXIAL APPROXIMATION, AND METHODS AND APPARATUSES OF LENS FLARE RENDERING BASED ON BLENDING

CROSS-REFERENCE TO RELATED APPLICATION

This application claims priority to Korean Patent Application No. 10-2013-0108389 filed on Sep. 10, 2013 and No. 10-2014-0073605 filed on Jun. 17, 2014, the contents of which are herein incorporated by reference in its entirety.

BACKGROUND

Field

The present invention relates to methods of generating optical effects, and more specifically, to methods of generating lens flare effects.

Description of Related Art

Lens flare is caused by an undesired light reflection in an optical system. Lens flare occurs when light rays passing through the optical system are reflected towards an unintended direction by the lens surface. A lens is designed to refract incident light to reach a sensor. However, light trajectory may be changed by reflection on the interface in the lens, and even-numbered light reflections would cause the sensor to have an undesired pattern. This is called "lens flare." A flare pattern caused by a single even-numbered reflection pattern is denoted "ghost." Such a ghost is sensed only when there is a sufficient amount of light and the light is thus viewed by human eyes. A ghost passes through an aperture as if typical light refraction does, and it is similar in shape to the aperture.

Lens flare, although considered a defect by optics manufacturers, is observed in a picture or video in many cases, and is thought as an inevitable element for realistic imaging. A typical method of calculating a lens flare is to completely track a path along which incident light is reflected and reaches a sensor. Such a method may provide for securing of a very high-quality image, but suffers from a very large computation load on a complicated optical system. Thus, the method is hard to use in real-time. Real-time methods often used for video games or virtual reality generally employ texture sprites. In Such a methods, the artist manually designs and arranges flare sprites. Rendering in the methods is enough to provide a real-time performance, but consumes lots of time in designing and is complicated and difficult. Moreover, Such a methods take little consideration of actual physical models for lenses, causing objects to be viewed unrealistically.

Meanwhile, lens flare mostly has a linear pattern but some non-linear patterns that are considerably deformed play a critical role in reality of the lens flare. Accordingly, a need exists for techniques for generating lens flare that may include non-linear patterns as well as linear patterns in real-time applications.

SUMMARY

To overcome the above-described objects, an object of the present invention is to provide a method and apparatus of generating a lens flare, which quickly and effectively simulates sprites using physical characteristics of a lens system to create a more precise lens flare rendering result.

Further, an object of the present invention is to provide a blending-based lens flare rendering method and apparatus that may generate a lens flare including a non-linear pattern as well as a linear pattern in real-time applications.

To achieve the above objects, according to an embodiment of the present invention, a method of generating information on a projected position, performed in a lens flare generation apparatus, comprises generating light path changing information on at least one lens using information on the at least one lens included in a lens system; and generating projected position information to generate a projected position on a sensor corresponding to a light ray incident position of the lens system using the light path changing information.

The light path changing information is a virtual light path conversion equation for the at least one lens.

The light path conversion equation is a conversion equation that performs linear approximation on a light path with respect to a light axis of the lens.

The lens information includes at least one of a refractive index and a radius of the lens.

Generating the projected position information to generate the projected position on the sensor corresponding to the light ray incident position of the lens system using the light path changing information includes generating the projected position information by computing, according to an order of at least one lens over a path along which a light ray is transmitted, the light path changing information for the lens along the path where the light ray is transmitted, the path including at least one lens.

The path along which the light ray is transmitted includes a path along which the light ray is reflected by the lens.

To achieve the above objects, according to an embodiment of the present invention, a lens flare generation method performed by a lens flare generation apparatus, comprises generating a projected position on a sensor corresponding to an incident position of a light ray incident on an incident plane using preset projected position information and the incident position of the at least one light ray incident on an incident plane; and generating a lens flare using the projected position on the sensor.

Generating the lens flare using the projected position on the sensor includes determining a size of a sprite using at least two projected positions on the sensor corresponding to the incident position of the light ray on the incident plane.

Generating the lens flare using the projected position on the sensor includes determining at least one of a position and size of a sprite using projected positions of a first light ray and a second light ray on the sensor, the first light ray corresponding to a center of a region of an incident light ray incident on the incident plane, and the second light ray incident on a position farthest from the first light ray in the region of the incident light ray incident on the incident plane.

Determining whether the incident position of the at least one light ray incident on the incident plane determines incident positions of at least two light rays, wherein generating the lens flare using the projected position on the sensor includes determining an incident area of the incident light ray using two incident positions of the light ray on the incident plane; determining a size of a projected area on the sensor using two projected positions on the sensor corresponding to the two incident positions; and determining a brightness of the lens flare using a ratio of the incident area and the projected area.

Determining the incident position of the at least one light ray incident on the incident plane includes determining a valid incident region where a light ray may pass through an aperture and arrive at the sensor using shape information of the aperture and the projected position information.

Generating the lens flare using the projected position on the sensor includes generating the lens flare using shape information of an aperture.

To achieve the above objects, according to an embodiment of the present invention, a lens flare generation apparatus comprises a calculating unit configured to generate light path changing information on at least one lens using information on the at least one lens included in a lens system and to generate projected position information to generate a projected position on a sensor corresponding to an light ray incident position of the lens system using the light path changing information.

The information on the lens includes at least one of a refractive index and radius of the lens.

The calculating unit is configured to compute the light path changing information on the lens along a path where a light ray is transmitted, the path including at least one lens, according to an order of the at least one lens over the path along which the light ray is transmitted to generate projected position information.

The path along which the light ray is transmitted includes a path along which the light ray is reflected by the lens.

To achieve the above objects, according to an embodiment of the present invention, a lens flare generation apparatus of generating a lens flare comprises a rendering unit configured to generate a projected position on a sensor corresponding to an incident position of a light ray using preset projected position information and the incident position of the at least one light ray incident on an incident plane and to generate a lens flare using the projected position on the sensor.

The rendering unit is configured to determine a size of a sprite using at least two projected positions on the sensor corresponding to the incident position of the light ray on the incident plane.

The rendering unit is configured to determine at least one of a position and size of a sprite using projected positions of a first light ray and a second light ray on the sensor, the first light ray corresponding to a center of a region of an incident light ray incident on the incident plane, and the second light ray incident on a position farthest from the first light ray in the region of the incident light ray incident on the incident plane.

The rendering unit is configured to determine an incident area of an incident light ray using incident positions of at least two light rays on the incident plane, to determine a size of a projected area where the two light rays are projected on the sensor using positions on the sensor corresponding to incident positions of the two light rays on the incident plane, and to determine a brightness of the lens flare using a ration of the determined incident area and the determined projected area.

An input unit is configured to determine a valid incident region where a light ray may pass through an aperture and arrive at the sensor using shape information of the aperture and the projected position information.

The rendering unit is configured to generate the lens flare shaped as the aperture using the shape information of the aperture.

To achieve the above objects, according to an embodiment of the present invention, a lens flare generation method performed by a lens flare generation apparatus, comprises pre-generating a non-linear pattern according to a position of a light ray incident on an incident plane; and generating a lens flare using the generated non-linear pattern and a linear pattern.

Pre-generating includes detecting at least one ghost pattern that causes reflection of at least one lens included in a lens system; generating a first non-linear pattern for the at least one ghost pattern while varying a first parameter that is an angle at which an incident light ray is inclined with respect to a light axis; and generating a look-up table including the first non-linear pattern.

Pre-generating includes generating a second non-linear pattern using a picture and/or video entirely captured by a camera with respect to the angle between the incident light ray and the light axis; and storing the second non-linear pattern in the look-up table.

The lens flare generation method further comprises determining whether to use the linear pattern upon reproduction of the lens flare.

Generating the lens flare includes when the linear pattern is determined to be used, selecting at least one non-linear pattern of first non-linear patterns stored in the look-up table; correcting the at least one non-linear pattern by rearranging the at least one non-linear pattern along the light axis based on a second parameter indicating an angle at which a virtual light source rotates on the incident plane; and blending the corrected at least one non-linear pattern and the linear pattern.

Correcting the at least one non-linear pattern further includes performing the correction so that at least one of a size and brightness of the at least one non-linear pattern corresponds to the linear pattern.

The blending includes performing blending in an additive blending method that adds the corrected at least one non-linear pattern to the linear pattern.

The blending includes blending the corrected at least one non-linear pattern and the linear pattern in a linear or non-linear interpolation method.

The blending includes blending the corrected at least one non-linear pattern and the linear pattern using an alpha channel of an image.

Generating the lens flare includes when the linear pattern is determined to be not used, selecting the second non-linear pattern stored in the look-up table; and generating a non-linear lens flare using the second non-linear pattern.

The pre-generating includes detecting at least one ghost pattern causing reflection of at least one lens included in a lens system; generating a first non-linear pattern for the at least one ghost pattern using both a first parameter that is an angle at which an incident light ray is inclined with respect to a light axis and a second parameter indicating a degree at which an incident light ray projection on the incident plane rotates about the light axis; and compressing the first non-linear pattern and storing the compressed first non-linear pattern in the look-up table.

To achieve the above objects, according to an embodiment of the present invention, a lens flare generation apparatus generating a lens flare comprises a lens flare generation unit configured to generate a lens flare using a linear pattern and a non-linear pattern pre-generated according to a position of a light source incident on an incident plane.

The lens flare generation apparatus further comprises a look-up table generation unit configured to generate a look-up table including the non-linear pattern.

The look-up table generation unit is configured to store a first non-linear pattern generated through simulation and a second non-linear pattern generated through camera capturing in the look-up table.

The look-up table generation unit is configured to generate the first non-linear pattern for at least one ghost pattern that causes reflection of at least one lens while varying a first parameter that is an angle at which an incident light ray is inclined with respect to a light axis.

The look-up table generation unit is configured to generate the second non-linear pattern using a picture and/or video entirely captured by a camera with respect to the angle between the incident light ray and the light axis.

The lens flare generation unit is configured to determine whether to use the linear pattern upon reproduction of the lens flare.

The lens flare generation unit is configured, when the linear pattern is determined to be used, to select at least one non-linear pattern among first non-linear patterns stored in the look-up table, to correct the at least one non-linear pattern by rearranging the at least one non-linear pattern along the light axis based on a second parameter indicating an angle at which a virtual light source rotates on the incident plane, and to blend the corrected at least one non-linear pattern and the linear pattern.

The lens flare generation unit is configured, when the linear pattern is determined to be not used, to select the second non-linear pattern stored in the look-up table and to generate a non-linear lens flare using the second non-linear pattern.

The look-up table generation unit is configured to generate the first non-linear pattern for at least one ghost pattern using both the first parameter and a second parameter indicating a degree at which an incident light ray projection on the incident plane rotates about the light axis and to compress the generated first non-linear pattern.

According to an embodiment of the present invention, a lens flare generation method and apparatus simulates a lens flare effect through linear approximation close to paraxial estimation to generate a lens flare utilizing physical characteristics of the lens system and to generate a lens flare at remarkably high speed as compared with conventional arts.

Further, according to another embodiment of the present invention, a blending-based lens flare rendering method and apparatus adds non-linear effects to linear pattern-based lens flare effects, so that a lens flare may be generated reflecting most of physical characteristics created from a lens system. Nonetheless, use of a pre-recorded non-linear pattern allows for generation of a lens flare having similar quality to that obtained by the conventional light ray tracking-based simulation at a higher speed than the conventional techniques without reducing speed.

DETAILED DESCRIPTION

Figure 1:
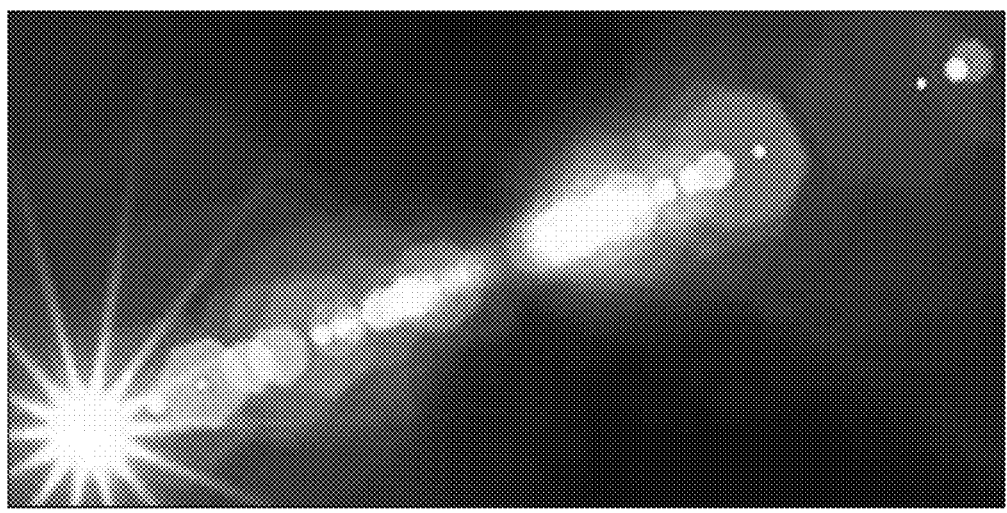
FIG. 1 is a view illustrating a lens flare generated using a lens flare generation method according to an embodiment of the present invention.

Various modifications may be made to the present invention and the present invention may have a number of embodiments. Specific embodiments are described in detail with reference to the drawings. However, the present invention is not limited to specific embodiments, and it should be understood that the present invention includes all modifications, equivalents, or replacements that are included in the spirit and technical scope of the present invention.

The terms "first" and "second" may be used to describe various components, but the components are not limited thereto. These terms are used only to distinguish one component from another. For example, the first component may be also named the second component, and the second component may be similarly named the first component. The term "and/or" includes a combination of a plurality of related items as described herein or any one of the plurality of related items.

When a component is "connected" or "coupled" to another component, the component may be directly connected or coupled to the other component. In contrast, when a component is directly connected or coupled to another component, no component intervenes.

The terms used herein are given to describe the embodiments but not intended to limit the present invention. A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Unless defined otherwise, all the terms used herein including technical and scientific terms have the same meaning as generally understood by those skilled in the art. The terms as generally used and defined in the dictionary should be understood as having the same meaning as understood in the context, and unless clearly defined herein, but not should be construed in an ideal or excessive manner.

Hereinafter, embodiments of the present invention are described with reference to the accompanying drawings. For better understanding, the same reference numerals are used to denote the same or substantially the same elements throughout the specification and the drawings.

FIG. 1 shows an example lens flare generated by a lens flare generation method according to an embodiment of the present invention. According to an embodiment of the present invention, the lens flare generation method performs first approximation on physical characteristics of a sprite using a matrix based on paraxial assumption in lens flare rendering to thus simulate the position, size, and brightness of the lens flare. The sprite is a basic object constituting a flare. For example, the hexagonal images shown in FIG. 1 represent sprites, respectively. Further, according to an embodiment of the present invention, a lens flare generation method utilizes matrix-based first light ray tracking for conducting physically close approximation on the position, size, and brightness of corners of the sprites. Light ray tracking may use a system matrix considering reflection between optical interfaces beyond general optical system simulation. Further, according to an embodiment of the present invention, a lens flare generation method may apply each or all of optical interfaces and includes a system matrix-based method that uses optical interfaces with the optical interfaces bundled up in a single matrix.

Optical Interface

The lens manufacturer commonly describes an optical system as a set of interfaces arithmetically defined. An optical interface is plane or spherical like a general aperture or sensor. Each spherical interface is defined with a radius having a sign indicating convex or concave and a thickness measured along an optical axis. Further, such description of a lens system also defines an optical material such as glass or air, refractive index, and height with respect to the optical axis (hereinafter, simply referred to as "optical axis height"). Such optical designs may be obtained from media providing specialized information such as patents, and according to an embodiment of the present invention, a lens flare generation method constitutes an optical system as shown below in Table 1 based on such designing materials.

TABLE 1

| radius | thickness | material | refractive index | sa (heights) |
|---|---|---|---|---|
| 30.810 | 7.700 | LAKN7 | 1.652 | 14.5 |
| −89.350 | 1.850 | F5 | 1.603 | 14.5 |
| 580.380 | 3.520 | air | | 14.5 |
| −80.630 | 1.850 | BAF9 | 1.643 | 12.3 |
| 28.340 | 4.180 | air | | 12.0 |
| | 3.000 | air (iris aperture) | | 11.6 |
| | 1.850 | LF5 | 1.581 | 12.3 |
| 32.190 | 7.270 | LAKI3 | 1.694 | 12.3 |
| −52.990 | 81.857 | air | | 12.3 |

Figure 3:
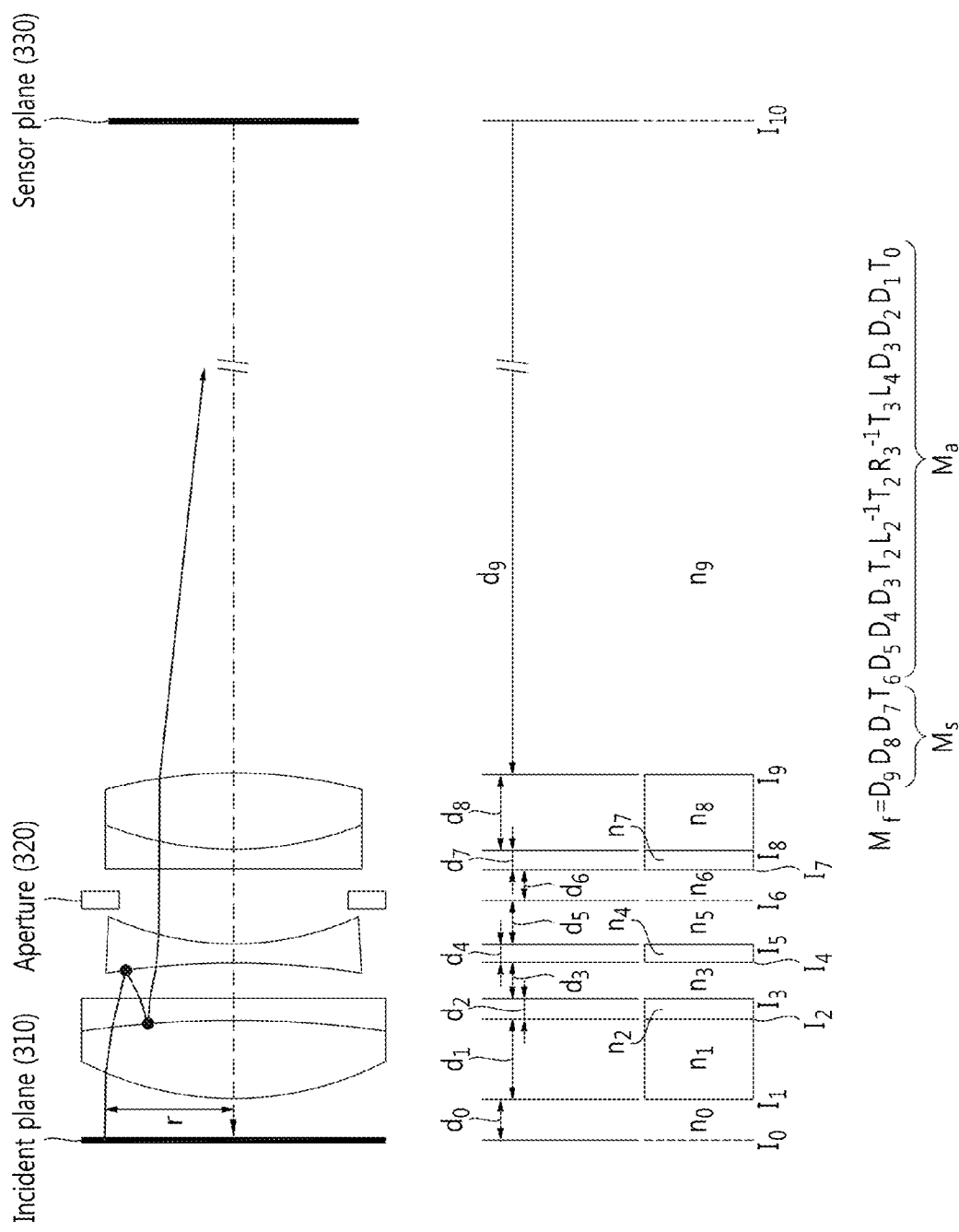
FIG. 3 is a concept view illustrating light translation in a lens flare generation method according to an embodiment of the present invention.

Table 1 shows arithmetic specifications (Heliar Tronnier; U.S. Pat. No. 2,645,156) of a specific optical system. The optical system shown in Table 1 is about a lens system including lenses respectively having radii of 30.810, −89.350, −80.630, and 32.190. An example lens system corresponding to Table 1 is shown in FIG. 3. For example, a lens having a radius of 30.810 has a thickness of 7.700, a material of LAKN7, a refractive index of 1.652, and an optical axis height of 14.5. Likewise, a lens having a radius of −89.350 has a thickness of 1.850, an optical material of F5, a refractive index of 1.703, and a height of 14.5.

When passing through the lens system shown in Table 1, a light ray sequentially passes through the lenses respectively having radii of 30.810, −89.350, −80.630, and 32.190 without reflection. In Table 1, where the optical material is air refers to where air is filled between a lens and another lens. The "air (iris aperture)" means an aperture in the lens system. According to an embodiment of the present invention, a lens flare generation method directly uses the values of the lens system shown in Table 1. Meanwhile, the height of interface shown in Table 1 may be disregarded.

Optical Matrix

According to an embodiment of the present invention, a lens flare generation method adopts first paraxial approximation (linear paraxial approximation). Linear paraxial approximation offers an undisregardable error for angles of 10 degrees or more, but provides for quick analysis for critical characteristics of a lens system. For example, the paraxial ray refers to a light ray that forms a small inclination with respect to an optical axis and approaches the optical axis. According to an embodiment of the present invention, a lens flare generation method utilizes multiplying of matrixes instead of typical light ray tracking in order to consider intersection between a lens interface and a light ray. Such matrixes may be consecutively multiplied, so that path tracking on a complicated optical system may be represented with matrixes within a constant number time. Accordingly, according to an embodiment of the present invention, a lens flare generation method simplifies analysis of the optical system. According to an embodiment of the present invention, a lens flare generation method enables real-time processing without any pre-treatment steps.

Paraxial approximation refers to approximation of a trigonometrical function on a small angle and is useful for analysis of optical systems. According to an embodiment of the present invention, a lens flare generation method uses first Maclaurin expansion together with approximation such as $\sin \theta \approx \theta$, $\tan \theta \approx \theta$, and $\cos \theta \approx 1$. All incident light rays may be assumed to be meridional light rays. For example, light rays and light axes may be included in a plane. From such analysis and the fact that interfaces are generally symmetrical, propagation of light rays is fulfilled in 2D analysis and all the interfaces are approximated to a parallel line.

Figure 2:
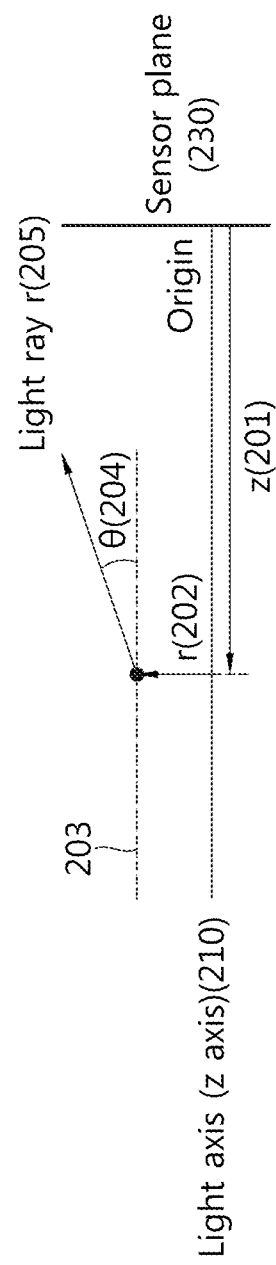
FIG. 2 is a concept view illustrating denoting light rays in a lens flare generation method according to an embodiment of the present invention.

A lens flare generation method according to an embodiment of the present invention is described in connection with FIG. 2. An optical light ray r 205 having a start point positioned at a distance z 201 on a sensor plane 230 is represented as $r=[r\theta]^T$. r 202 is an offset with a sign from an optical axis to the light ray, and θ 204 is an angle between the optical axis 210 and the light ray r 205. For example, θ 204 may be a difference in angle between the axis 203 that is parallel with the optical axis 210 and the light ray r 205. For example, when the light ray is oriented upwards, θ may have a positive value, while θ may have a negative value when the light ray is oriented downwards.

TABLE 2

| Optical component | Ray transfer matrix |
|---|---|
| Translation ($T_i$) | $\begin{bmatrix} 1 & d_i \\ 0 & 1 \end{bmatrix}$ |
| Refraction at spherical dielectric interface ($R_i$) | $\begin{bmatrix} 1 & 0 \\ \frac{n_1 - n_2}{n_2 R_i} & \frac{n_1}{n_2} \end{bmatrix}$ |
| Reflection from a spherical mirror ($L_i$) | $\begin{bmatrix} 1 & 0 \\ \frac{2}{R_i} & 1 \end{bmatrix}$ |

A mutual interaction between the light ray and an interface i is represented as a 2×2 light ray translation matrix $M_i$. Table 2 above represents a translation matrix $M_i$ that includes light path transformation information indicating a change in light path, which occurs due to the mutual interaction between the light ray and the interface i. According to an embodiment of the present invention, a lens flare generation method uses a matrix that may represent a translation in a homogeneous medium, together with reflection in addition to typical refraction in order to simulate a lens flare.

Table 2 includes optical components and a translation matrix according thereto. Table 2 shows, as optical components, translation, refraction at spherical dielectric interface, and reflection from a spherical mirror.

The translation matrix relative to displacement $d_i$ is represented as $T_i$, refraction matrix as reflection matrix representing reflection at interface i as $L_i$, and the matrixes are represented as their respective corresponding matrixes shown in Table 2.

In the matrixes shown in Table 2, n refers to a refractive index, and R refers to the radius of an interface. In order to obtain displacement $d_i$, information on the shape and arrangement in the lens system of each lens may be received. $d_i$ may be calculated as light propagation is simulated based on the information on the shape and arrangement of the lenses.

The matrixes shown in Table 2 contain only values that may be obtained from technical materials provided from the lens manufacturer and may be calculated on any optical system. Meanwhile, although the matrixes are calculated with respect to spherical interfaces, it should be noted that the interfaces are shown with vertical lines parallel with each other, according to an embodiment of the present invention.

Generate Lens Flare Matrix

FIG. 3 is a concept view illustrating an example of generating a lens flare matrix in a specific lens system in a lens flare generation method according to an embodiment of the present invention. FIG. 3 is a concept view illustrating light propagation in a certain lens system. Referring to FIG. 3, a process of generating a lens flare matrix by the lens flare generation method according to an embodiment of the present invention is described. The lens flare matrix includes projected position information indicating a position where a light ray incident onto an incident plane is projected to a sensor plane through a lens system.

As described above, the mutual interaction between an interface and a light ray at each interface may be represented as a matrix. For example, the overall path of a light ray may be defined as serial multiplication of matrixes. A standard system matrix considers only refraction and translation of light rays from an incident plane 310 to a sensor plane 330, but in lens flare simulation, reflection is taken into account as well. In order for a lens flare to be shown on the sensor plane 330, light reflection should occur an even number of times. For example, in case an odd-number of times of reflection occurs, a light ray is travelling back in the incident direction. For example, a lens flare having only two reflections may be considered. In case a lens flare generated when two times of reflection takes place is only considered, a limited number of matrixes representing a lens system are determined, which are defined as flare matrixes. One matrix designates a lens flare path possible in the lens system and defines a sprite pattern in the final rendering image. Refraction and reflection in the opposite direction along the light path may be represented by obtaining inverse matrixes of the matrixes.

FIG. 3 shows an example flare path where a reflection occurs at interfaces $I_4$ and $I_2$. FIG. 3 illustrates a lens system having the specifications shown in Table 1. When no reflection takes place, a light ray coming through an incident plane 310 in the lens system shown in FIG. 3 undergoes displacement from $d_0$ to $d_9$ and then reaches a sensor plane 330. For example, a light ray passes from interface $I_0$ through a medium having a refractive index of $n_0$ and undergoes a displacement $d_0$ and then arrives at interface $I_1$. The light ray then passes through the interface $I_1$, undergoes displacement d1 in the medium having a refractive index n1, and then reaches interface $I_2$. The light ray passes through the interfaces positioned along the path until it reaches the sensor plane 330, passes through the medium having the refractive index, undergoes the displacement, and then reaches the sensor plane 330.

A reflection may occur at any interface in the example shown in FIG. 3. In this embodiment, an example where two reflections take place, for example, when reflection occurs at interfaces $I_2$ and $I_1$, at interfaces $I_3$ and $I_1$, or at interfaces $I_4$ and $I_1$, is described.

A flare path where reflection occurs at interfaces $I_4$ and $I_2$ shown in FIG. 3 may be represented as flare matrixes with matrix multiplication using the matrixes shown in Table 2 along the light path where reflection takes place. For example, since a light ray has a displacement d0, this provides a matrix $T_0$. The light ray then passes through interface $I_1$, and since the medium has different refractive indexes at parts before and after interface $I_1$, is refracted. The refraction at interface $I_1$ may be represented as $R_1$ using the refraction matrix R shown in Table 2. Accordingly, the thus-far light translation may be represented as matrix multiplication of $R_1$ and $T_0$, which may be represented as $R_1 T_0$.

After passing through interface $I_1$, the light ray undergoes a displacement $d_1$ up to interface $I_2$. This is represented as translation matrix $T_1$. Thus-far light translation may be represented as matrix multiplication $T_1R_1T_0$.

Similarly, the light ray passes through the interfaces $I_2$ and $I_3$ before it is reflected at the interface $I_4$. The light translation up to the interface $I_4$ may be represented as $T_3R_3T_2R_2T_1R_1T_0$. Here, for ease of description, matrix multiplication $T_nR_n$ may be represented as $D_n$. In such case, the light translation up to the interface $I_4$ ($T_3R_3T_2R_2T_1R_1T_0$) may be represented as $D_3D_2D_1T_0$.

The light reflection at interface $I_4$ may be represented as $L_4$ using the reflection matrix L shown in Table 2. Accordingly, the light translation representing the reflection up to interface $I_4$ may be represented as $L_4D_3D_2D_1T_0$.

After the reflection at interface $I_4$, the light ray is rendered to travel towards the incident plane 310. As described above, in case the light ray propagates in an opposite direction of the incident direction, the matrix representing the light translation uses the inverse matrix of each of the matrixes shown in Table 2. Accordingly, the process where light reflected at interface $L_4$ passes through interface $L_3$ to interface $L_2$ may be represented as multiplication of the inverse matrixes of the translation matrix T, refraction matrix R and reflection matrix L. Since the translation matrix T contains a displacement, the inverse matrix of T may be represented as T. For example, the process where light reflected at interface $L_4$ passes through interface $L_3$ to interface $L_2$ may be represented as $T_2R_3^{-1}T_3$. Thus, light translation until light incident from the incident plane 310 is reflected at interface $I_4$ and is then reflected at interface $I_2$ is represented as $L_2^{-1}T_2R_3^{-1}T_3L_4D_3D_2D_1T_0$.

Finally, light translation from interface $I_2$ through the aperture 320 to the sensor plane 330 may be represented as a matrix multiplication $D_9D_8D_7T_6D_5D_4D_3T_2$ in the above-described manner. Accordingly, in the example shown in FIG. 3, which shows a path of light generated when light reflection takes place at interfaces $I_4$ and $I_2$, the light translation may be represented as a matrix multiplication $D_9D_8D_7T_6D_5D_4D_3T_2L_2^{-1}T_2R_3^{-1}T_3L_4D_3D_2D_1T_0$. Since $M_f$ is a path allowing light incident onto the incident plane 310 to generate a lens flare at the sensor plane 330, $M_f$ may be used as a flare matrix. In such way, flare matrixes obtained by a combination of reflections that occur at each interface in the lens system may be represented as multiplication of the matrixes.

Flare-Quad Mapping

The above-described light translation model may be directly applied to an actual sprite arrangement in the conventional sprite-based methods. The linear system according to the present invention may be limited to four points corresponding to four light rays on an incident plane, and the direction of each light ray may be defined as a direction of an incident light ray. Such four points form one flare-quad. Hereinafter, the "flare-quad" is defined as a region specified with a pair of four points corresponding to four light rays incident onto an incident plane. The flare-quad may directly correspond to a sensor plane using the above-described flare matrix. The flare-quad corresponding to the sensor plane may define a position and size of a sprite corresponding to one lens flare ghost pattern. For example, a sprite may be generated at a region corresponding to a flare-quad represented on a sensor plane, corresponding to a region surrounding four points incident onto an incident plane. The four points incident onto the incident plane may be any points, but the four points may be selected to form a quadrangle with the largest area on the incident plane or so that the four points constitute a quadrangle including the incident plane.

Further, for example, a lens flare ghost pattern may be generated of sprites created by computing all flare matrixes for one flare-quad. As another example, a lens flare ghost pattern may be generated by computing one flare matrix for a plurality of flare-quads. As still another example, a lens flare ghost pattern may be generated by computing a plurality of flare matrixes for a plurality of flare-quads and overlapping the computed flare matrixes.

According to an embodiment of the present invention, a lens flare generation method may blend a generated lens flare ghost pattern with the original image to thus create a final rendering image. For example, all the lens flare ghost patterns may be blended with the original mage, thus obtaining a final rendering image.

According to another embodiment, a sprite may be generated using two incident light rays. For example, in a region of incident light sensed at an incident region, a light ray positioned at the center of the region is selected as a first light ray, and in the incident region, any other light ray incident to the outermost portion may be selected as a second light ray. The incident positions of the two light rays on the incident plane are determined, and positions corresponding to the two determined positions on a sensor plane are determined using the above-described flare matrix. Lastly, a sprite region may be generated on the sensor plane using the distance from the position where the first light ray corresponds to the sensor plane to the position where the second light ray corresponds to the sensor plane. For example, the position where the first light ray corresponds to the sensor plane may be assumed to be the center of a circle while assuming that the radius of the circle is the distance between the position where the first light ray corresponds to the sensor plane and the position where the second light ray corresponds to the sensor plane, and in such case, the circle may be generated as a sprite region.

Figure 4:
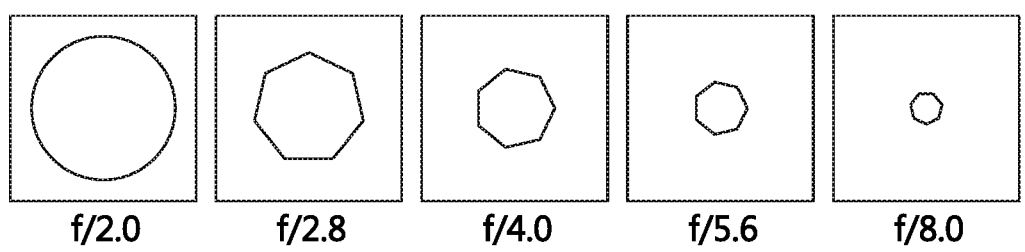
FIG. 4 is a view illustrating the shape of aperture texture in a lens flare generation method according to an embodiment of the present invention.

For example, according to an embodiment of the present invention, texture of an aperture as shown in FIG. 4 may apply to the sprite region generated upon using the above-described flare-quad and two points, so that the shape of the sprite is applied as the shape of the aperture.

Enhance Reality of Lens Flare

Hereinafter, a method of enhancing reality of a lens flare in a lens flare generation method according to an embodiment of the present invention is described.

According to an embodiment of the present invention, a lens flare generation method enhances reality directly using an aperture shape of an optical system. In order to consider an aperture, each flare matrix $M_f$ is separated with multiplication of two matrixes. $M_a$ is a matrix from an incident plane to an aperture, and $M_s$ is a matrix from the aperture to a sensor plane. Thus, the following relation may be defined: $M_f=M_sM_a$. FIG. 3 shows an example where a matrix is split using $M_s$ and $M_a$. The matrix from the incident plane to the aperture, $M_a$, is represented as $D_5D_4D_3T_2L_2^{-1}T_2R_3^{-1}T_3L_4D_3D_2D_1T_0$, and the matrix from the aperture to the sensor plane, $M_s$, is represented as $D_9D_8D_7T_6$.

A light ray on the incident plane, together with such two separate matrixes, may directly correspond to the aperture and a sensor. FIG. 4 is a view showing a shape of aperture texture in a lens flare generation method according to an embodiment of the present invention. As shown in FIG. 4, when the aperture shape is represented as texture that is an image pre-loaded on computer graphics, it may be determined whether a light ray obtained by using $M_a$ is blocked by the aperture. In case a light ray corresponds to a portion of the aperture image, which does not have a value, it is classified as a blocked light ray. Such determination may be easily made using a texture coordinate for a flare-quad. A light ray that is not blocked is applied with texture and then corresponds to the sensor plane.

In an embodiment, only reflection that takes place only at a side of the aperture in matrix separating may be taken into account. For example, matrix separation may be carried out considering only situations where two reflections occur before a light ray passes through the aperture, or after passing through the aperture, a light ray undergoes two reflections without passing again through the aperture. A light ray passing through the aperture three times results in a complicated computation and is thus not appropriate for real-time processing. Further, most of light is blocked by the aperture, so that such case may be disregarded in light of effects.

Further, in an embodiment, it may be considered that a light ray comes in a valid circular incident range on an incident plane in order to enhance performance. This is why a light ray may initially enter only through a lens tube defined to be circular. A lens flare generation method is applied to only light rays that may be incident, thus eliminating unnecessary computation. Accordingly, an enhancement in performance may be achieved.

Brightness

The brightness of a flare ghost varies depending on the size of the flare ghost. In the instant research method, the brightness of a flare ghost may be defined with the size of a flare-quad projected to a sensor plane. For example, the brightness of each flare ghost may be determined with a ration in size of a flare-quad on an incident plane to a flare-quad on a sensor plane. For example, in case the flare-quad on the sensor plane is smaller in size than the flare-quad on the incident plane, the brightness of a flare ghost may be increased two times more that when the flare-quad on the incident plane is equal in size to the flare-quad on the sensor plane.

Color

According to an embodiment of the present invention, a lens flare generation method may apply one color to each flare ghost without performing light tracking on all light rays. For example, a flare color may be applied to all flares with a brightness of linear illumination. For example, a flare color may be determined using a color owned by a light ray reaching a sensor plane, and the determined color may be then applied to all the flares. In such case, the brightness of the flare may be determined by the above-described method.

Further, according to an embodiment of the present invention, a lens flare generation method may consider a per-wavelength refractive index of a light ray in order to enhance simulation accuracy. For example, three wavelengths of standard RGB may be considered. As an example, the following wavelengths may be assumed: $\lambda_R=650$, $\lambda_G=510$, $\lambda_B=475$ nm. A per-wavelength refractive index may be obtained using Sellmeier's approximation. The above-described methods each are applied to each RGB channel, and an image is then synthesized, thus leading to a high-quality result.

Lastly, a direct light source is calculated using far-field diffraction (Fraunhofer approximation), and this gives rise to the same result as when the aperture's Fourier transform is scaled. In an embodiment, texture created by previously performing calculation on all wavelengths may be put to use.

Figure 5:
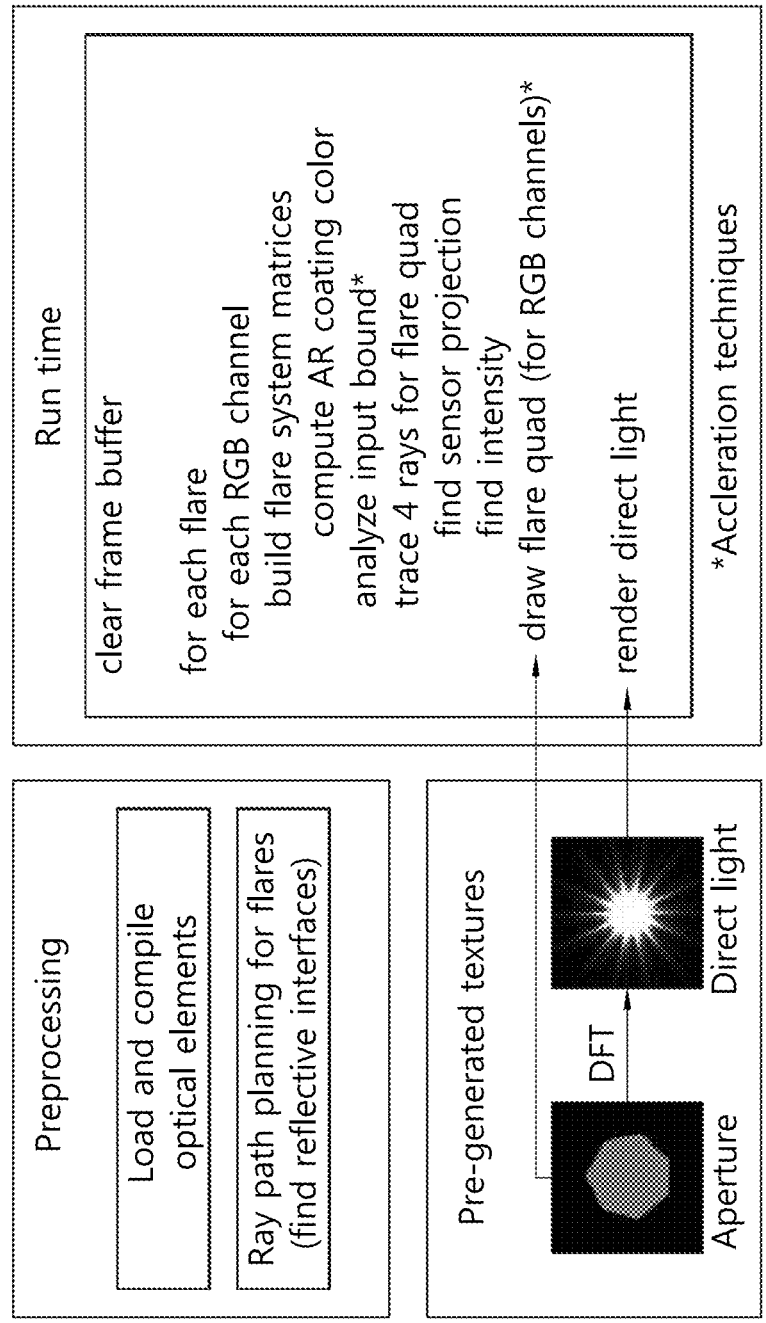
FIG. 5 shows a pseudo code representing a lens flare generation method according to an embodiment of the present invention.

FIG. 5 shows a pseudo code representing a lens flare generation method according to an embodiment of the present invention. The above-described lens flare generation method may be performed as shown in the block diagram of FIG. 5.

First, according to an embodiment of the present invention, the lens flare generation method creates a lens system by mounting and assembling optical components as a pre-treatment process. A light path for a flare in the lens system is then planned. Planning a light path for a flare includes, e.g., discovering a reflection interface as described above. Discovering a reflection interface may be, e.g., to specify a travelling path of a light ray which is specified by a pair of reflection interfaces.

After the pre-treatment is terminated, a lens flare is then generated on each flare in real-time during the course of execution.

Generating a flare includes generating a flare system matrix, determining a valid incident region to be described below, tracking four light rays for a flare-quad on the incident plane to determine the position and region on the sensor plane, and estimating the brightness from the area based on the determined position. The estimated position, region, and brightness of the flare-quad on the sensor plane, together with pre-generated aperture texture, may be used to draw a lens flare. Here, determining the valid incident region and estimating the brightness may be skipped. Further, according to an embodiment of the present invention, calculating any one of the position or region of the flare-quad on the sensor plane may also be omitted.

Generating the flare system matrix may include calculating a color of anti-reflective (AR) coating. Further, generating the lens flare may be performed on each RGB channel, and in such case, generating the flare system matrix on each flare may be conducted on each RGB channel, for example.

Finally, the method may further include rendering a direct light ray effect.

Figure 6:
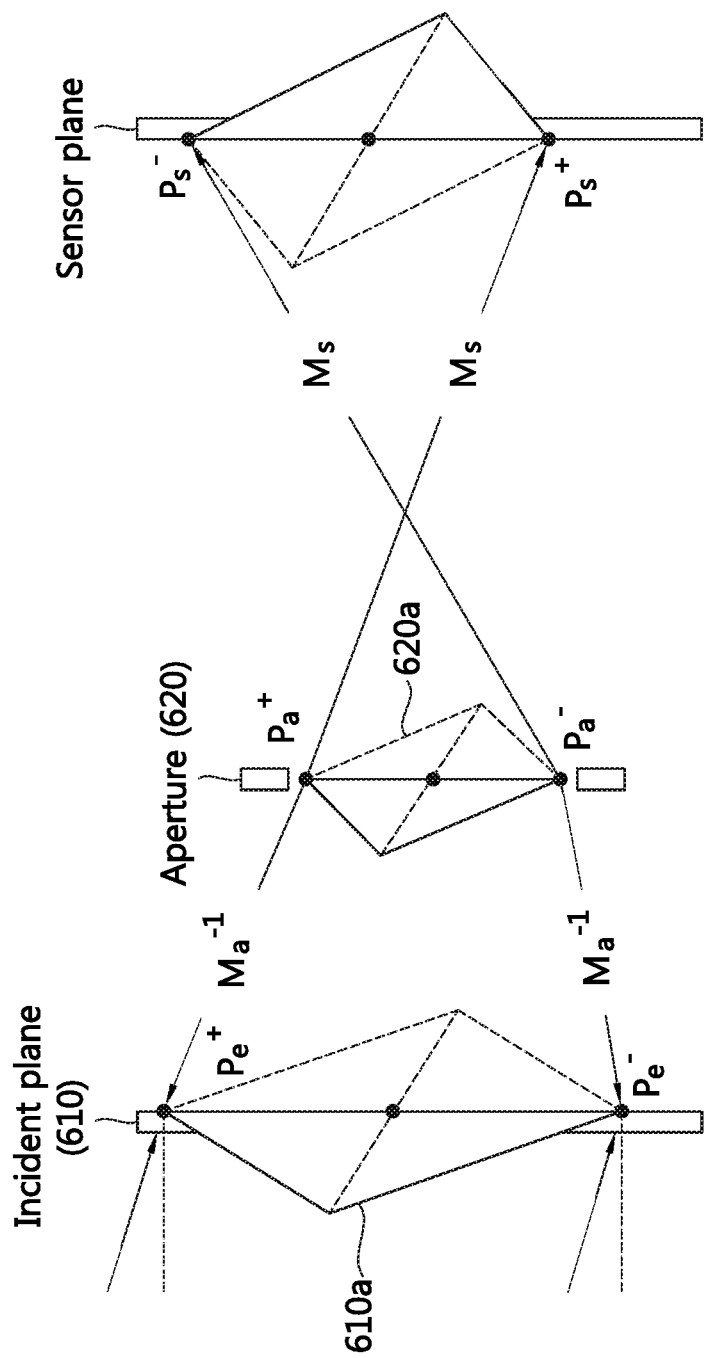
FIG. 6 is a view illustrating a valid incident region in a lens flare generation method according to an embodiment of the present invention.

Hereinafter, an accelerating scheme is described, according to an embodiment of the present invention. FIG. 6 is a view illustrating a valid incident region in a lens flare generation method according to an embodiment of the present invention. Use of a method of reducing time required for image generation may lead to an increased speed. Since in the above-described method all the flare-quads correspond to sensors, unnecessary calculation is in many cases performed on light rays blocked by the aperture 620 (i.e., not viewed on the final image). This may cause unnecessary additional calculation load. Accordingly, in an embodiment, unnecessary calculation load may be reduced by discovering a valid incident region 610a of the incident plane 610 corresponding to an aperture plane 620a of the aperture 620, which light is transmitted.

According to an embodiment of the present invention, a lens flare generation method determines the valid incident region 610a of a light ray through matrix analysis. As described above in connection with FIG. 2, a light ray on the incident plane 610 may be defined as $r_e=[r_e \theta_e]^T$, and a light ray at the aperture plane 620a may be defined as $r_a=[r_a \theta_a]^T$. Correspondence from the incident plane 610 to the aperture plane 620a is defined as $M_a$ matrix, and thus, inverse-correspondence from the aperture plane 620a to the incident plane 610 may be defined as follows by using the inverse matrix of $M_a$:

$$r_e = M_a^{-1} r_a \quad \text{[Equation 1]}$$

The angle, $\theta_e$, of the incident light ray is determined by an initial light ray, and thus, any $r_a$ and $r_e$ may be obtained.

$$r_e := (r_a - M_a^{12} \theta_e)/M_a^{11} \quad \text{[Equation 2]}$$

Here, $M_a^{11}$ and $M_a^{12}$ refer to the first and second elements in the matrix $M_a$.

A range of a valid light ray on the incident plane 610 (i.e., valid flare-quad) may be obtained by defining a $r_a$ value to surround the aperture plane 620a and using Equation 2. Accordingly, unnecessary calculation of an incident region (for example, raster conversion and pixel processing) may be reduced, thus leading to an increase in processing speed by 1.7 times through 5.2 times.

Figure 7:
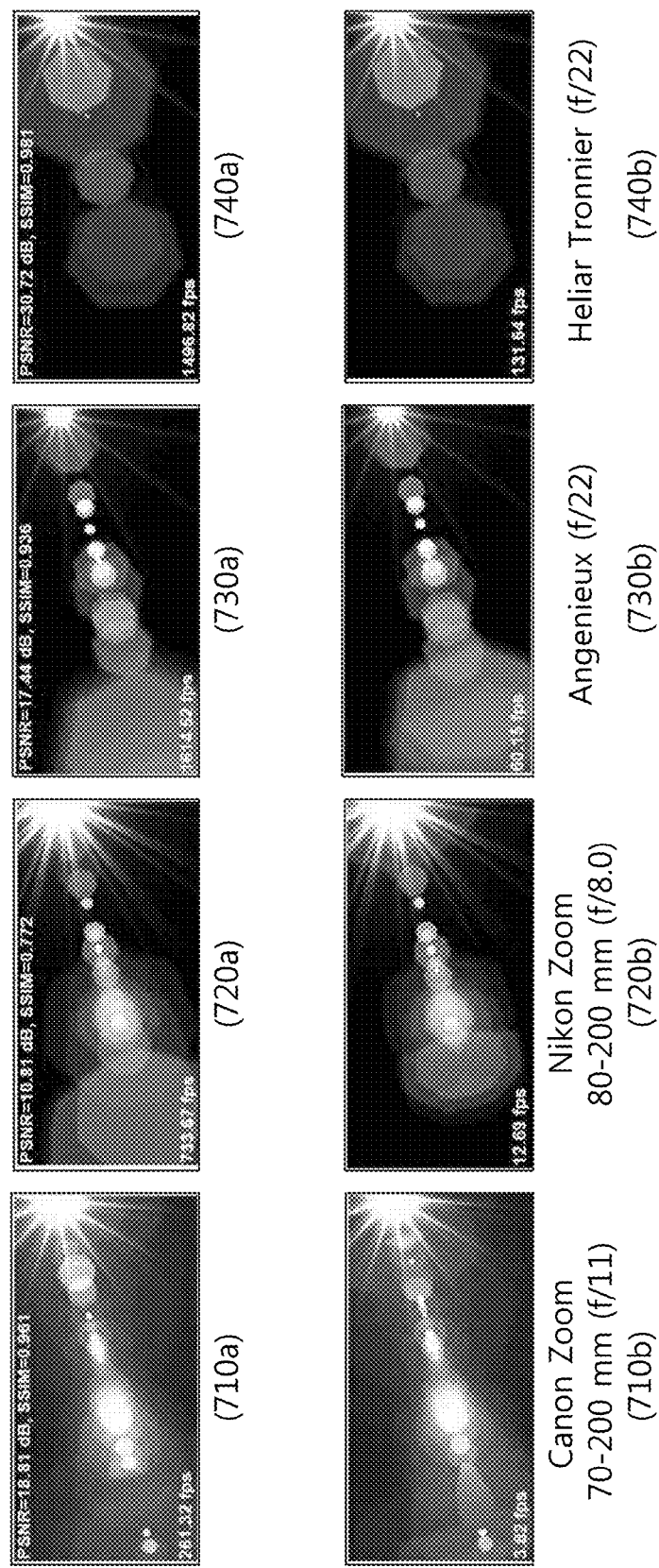
FIG. 7 is a view illustrating comparison between a lens flare generated using a lens flare generation method according to an embodiment of the present invention in a lens system and a lens flare generated using a conventional method in a lens system.

FIG. 7 is a view comparing a lens flare generated using a lens flare generation method according to an embodiment of the present invention in a lens system with a lens flare generated using a conventional method in a lens system.

710a, 720a, 730a, and 740a refer to lens flares generated by a lens flare generation method according to an embodiment of the present invention, and 710b, 720b, 730b, and 740b refer to lens flares generated by a conventional method.

It can be seen from FIG. 7 that the lens flares generated by the lens flare generation method according to an embodiment of the present invention provide similar quality to the lens flares generated by the conventional lens flare generation method and generates lens flare effects a few tens of times quickly as compared with the conventional method.

Hereinafter, the steps of a lens flare generation method according to an embodiment of the present invention are described in some embodiments. The following description is provided merely as an example, and a lens flare generation method according to the present invention is not limited to the order and steps of the following method and other steps may be rather added or some of the steps may be skipped, while the order of the steps may be changed.

Figure 8:
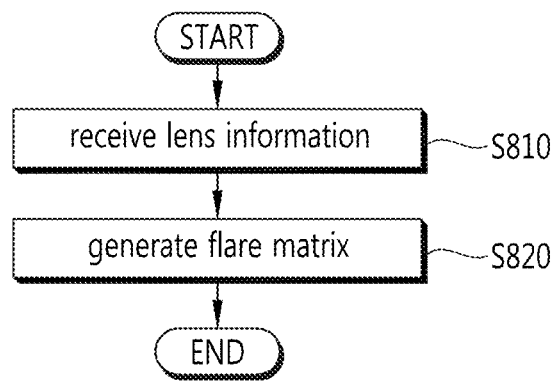
FIG. 8 is a flowchart illustrating the step of generating a lens flare matrix in a lens flare generation method according to an embodiment of the present invention.

FIG. 8 is a flowchart illustrating the step of generating a lens flare matrix in a lens flare generation method according to an embodiment of the present invention. The lens flare generation method according to an embodiment of the present invention may first receive lens information (S810) as described above and may generate a lens flare matrix using the received lens information (S820). The lens flare matrix may be generated with matrix multiplication of characteristic matrixes based on the characteristics of each lens as described above.

Figure 9:
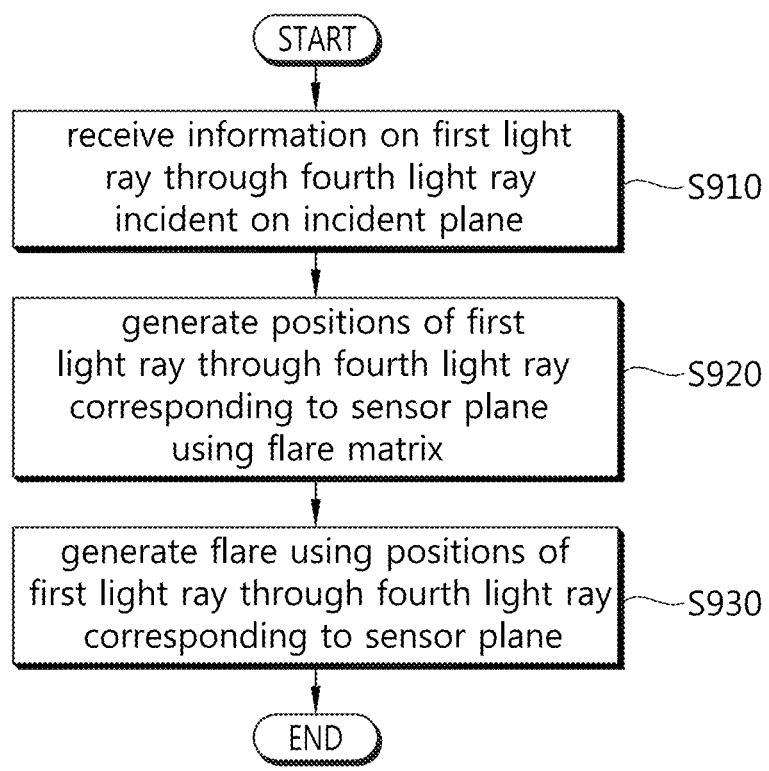
FIG. 9 is a flowchart illustrating the step of generating a lens flare according to an embodiment of the present invention.

FIG. 9 is a flowchart illustrating the step of generating a lens flare using a flare-quad according to an embodiment of the present invention. The lens flare generation method according to an embodiment of the present invention first receives information on, e.g., a first light ray through a fourth light ray incident onto an incident plane as described above (S910). For example, the first light ray through the fourth light ray constitute a flare-quad. A flare matrix is then used to generate positions corresponding to the first light ray through the fourth light ray on the sensor plane (S920). The positions corresponding to the first light ray through the fourth light ray on the sensor plane may specify the position and region of the flare-quad on the sensor plane. Finally, the lens flare generation method according to an embodiment of the present invention generates a lens flare using the positions corresponding to the first light ray through the fourth light ray (S930).

Figure 10:
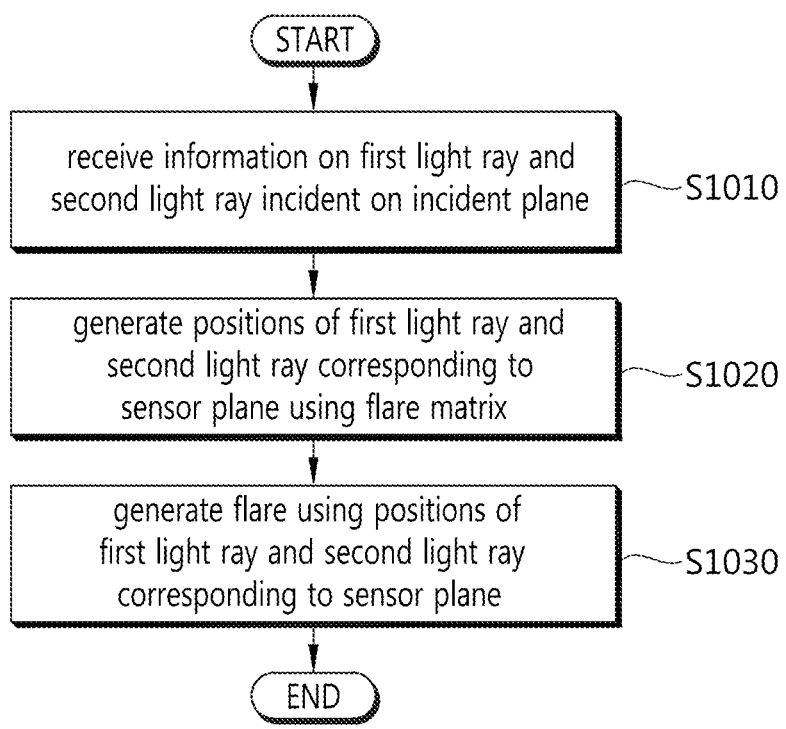
FIG. 10 is a flowchart illustrating the step of generating a lens flare according to another embodiment of the present invention.

FIG. 10 is a flowchart illustrating the step of generating a lens flare according to another embodiment of the present invention. The lens flare generation method according to an embodiment of the present invention first receives information on a first light ray and a second light ray incident onto an incident plane as described above (S1010). Here, the first light ray is incident to the central point of an incident light region, and the second light ray is any light ray other than the first light ray. For example, the second light ray may be a light ray incident farthermost from the first light ray among the incident light rays present in the valid incident region.

Next, a flare matrix may be used to generate positions corresponding to the first light ray and the second light ray (S1020). Finally, the positions corresponding to the first light ray and the second light ray are used to generate a lens flare (S1030). For example, in step S1030, the incident position of the first light ray corresponding to the sensor plane and the incident position of the second light ray may be used so that the position where the first light ray corresponds to the sensor plane is the center of a circle, while the distance between the position where the first light ray corresponds to the sensor plane and the position where the second light ray corresponds to the sensor plane is the radius of the circle, and a lens flare may be generated in the circle.

Figure 11:
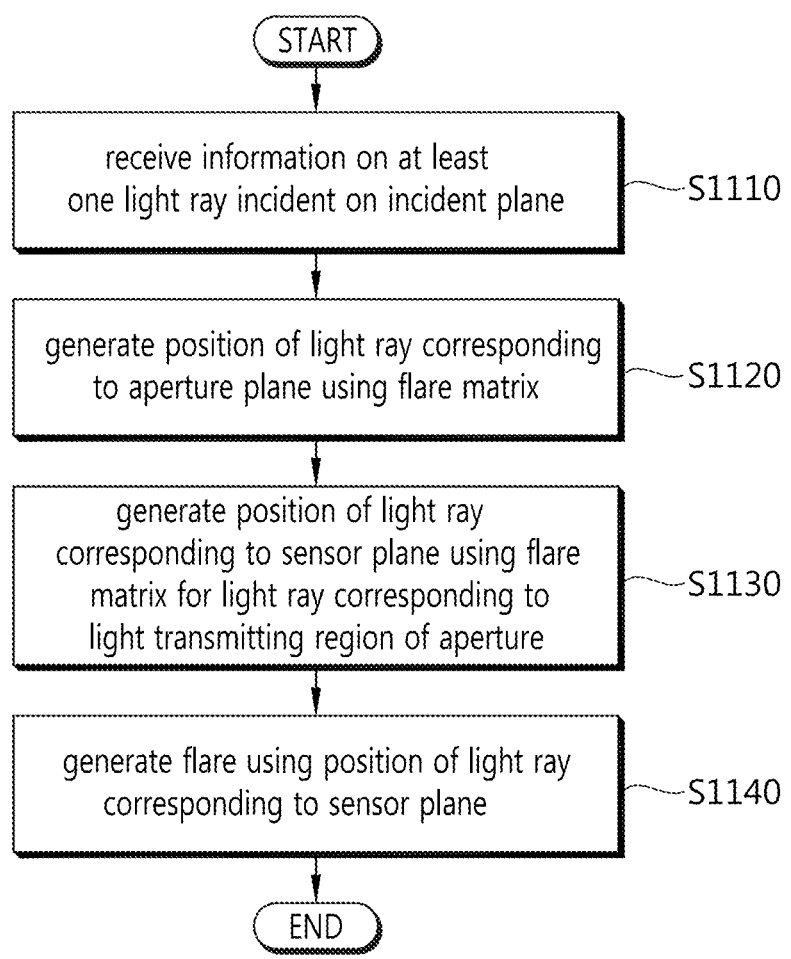
FIG. 11 is a flowchart illustrating the step of generating a lens flare according to still another embodiment of the present invention.

FIG. 11 is a flowchart illustrating the step of generating a lens flare according to another embodiment of the present invention. A lens flare generation method according to an embodiment of the present invention first receives information on at least one light ray incident to an incident plane as described above (S1110). A flare matrix is used to generate a position of the light ray corresponding to an aperture plane (S1120). The flare matrix is used on a light ray corresponding to a light transmitting region of the aperture, thus generating a position where the light ray corresponds to the sensor plane (S1130). Finally, the position where the light ray corresponds to the sensor plane is used to generate a lens flare (S1140).

Figure 12:
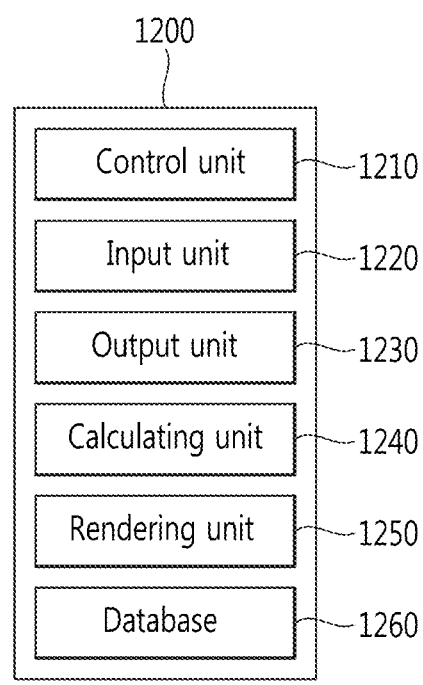
FIG. 12 is a block diagram illustrating a lens flare generating system according to an embodiment of the present invention.

FIG. 12 is a block diagram illustrating a lens flare generating system according to an embodiment of the present invention. The lens flare generating system lens flare generating system 1200 according to an embodiment of the present invention includes a Control unit 1210, an input unit 1220, an output unit 1230, a calculating unit 1240, a rendering unit 1250, and a database 1260.

The Control unit 1210 controls the input unit 1220, the output unit 1230, the calculating unit 1240, the rendering unit 1250, and the database 1260. The input unit 1220 receives information necessary to practice the present invention such as lens information, information on light rays incident onto the incident plane, and texture information of the aperture and receives a user's input manipulation. The output unit 1230 outputs a flare matrix and lens flare rendering results generated when practicing the present invention. The calculating unit 1240 calculates a lens flare matrix according to a lens flare generation method.

The rendering unit 1250 uses the input information and lens flare matrix to generate lens flare rendering results. The database 1260 may retain data necessary to practice the present invention such as lens information, lens system information, and information on light translation on the lens system. Further, the database 1260 may store the generated lens flare matrix and lens flare rendering results.

The Control unit 1210, the input unit 1220, the output unit 1230, and the calculating unit 1240 may be separately constituted in a system of calculating a flare matrix. Further, the Control unit 1210, the input unit 1220, the output unit 1230, and the rendering unit 1250 may be constituted of a separate system for rendering a lens flare. The above-described database 1260 may be an optional component used as necessary and may be omitted. Further, the input unit 1220 and the output unit 1230 may also be omitted as necessary.

The input unit 1220 includes a keyboard and/or a pointing device. The input unit 1220 and the output unit 1230 include a display unit for displaying graphics user interfaces in some embodiments.

As such, a first paraxial approximation (linear paraxial approximation)-based lens flare generation method according to an embodiment of the present invention performs physically close simulation based on linear paraxial approximation using the conventional texture sprites method without using light tracking. Accordingly, a lens flare may be generated precisely and at higher speed. The patterns of such lens flare are generally classified into linear lens flare patterns (hereinafter, "linear patterns") and non-linear lens flare patterns (hereinafter, "non-linear patterns"). A linear pattern is generated when the shape of an incident region where an incident light ray comes undergoes changes only in its size and brightness. Such linear patterns are formed to have substantially the similar shape as the aperture. A non-linear pattern is formed to have a very different shape from the aperture when the light path goes through a significant deformation before and after the light passes through the aperture so that the shape is varied or a change in topology is brought up (for example, a portion of the incident region is folded or twisted) or the light distribution is biased to a partial region.

As such, considering the fact that the lens flare patterns are classified into linear patterns and non-linear patterns, the above-described linear paraxial approximation-based lens flare generation method according to an embodiment of the present invention supports only generating linear patterns and cannot generate a non-linear pattern. Although most of lens flares have linear patterns, some non-linear patterns that experience significant deformations play a critical role in the reality of lens flares, and thus, a simulation technique for non-liner patterns is required.

To address such problems, a blending-based lens flare generation apparatus and method that may generate lens flares including non-linear patterns as well as linear patterns in real-time applications, according to other embodiments of the present invention, are described in detail with reference to FIGS. 13 through 22. According to another embodiment of the present invention, a method is provided below, which may generate a high-quality lens flare including a linear pattern and a non-linear pattern in real-time by pre-generating (recording) and storing the non-linear pattern according to the position of light and rearranging it upon subsequent rendering according to a virtual light position.

According to an embodiment of the present invention, a blending-based rendering method for generating a lens flare including a linear pattern and a non-linear pattern is not limited to a certain rendering method and may be applied to all rendering methods that may generate a linear pattern and a non-linear pattern and may be practiced. A non-linear pattern may be generated by recording through simulation or capturing a picture or video using only light source with no background using an actual camera and using the captured results. For the purpose of description, a non-linear pattern recorded through simulation is assumed to be used.

Figure 13:
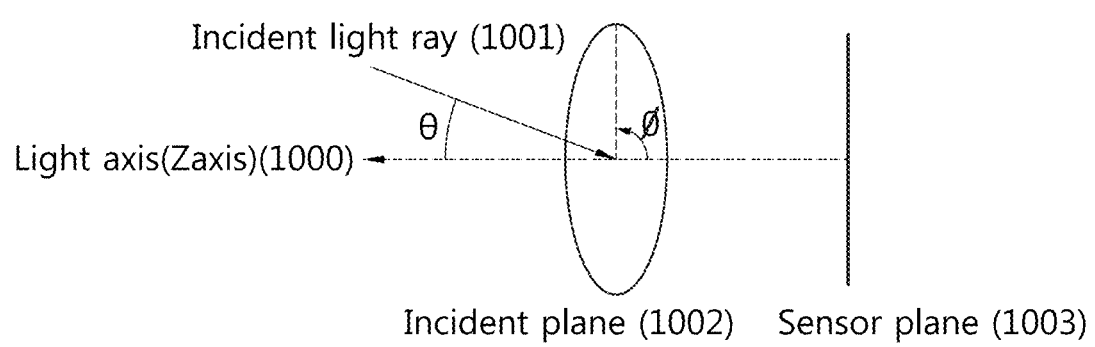
FIGS. 13 and 14 are concept views illustrating an example of representing a light source with parameters in order to generate a non-linear pattern according to an embodiment of the present invention.
Figure 14:
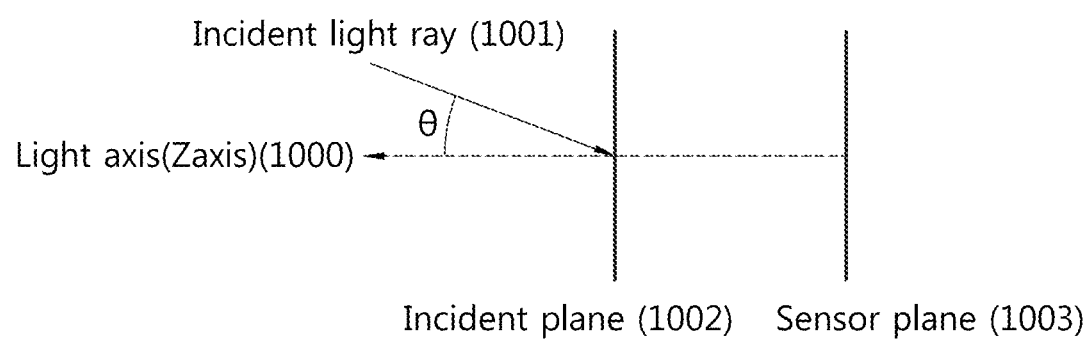

Represent Light Source with Parameters for Generating (Recording) Non-Linear Pattern FIGS. 13 and 14 are concept views illustrating an example of representing a light source with parameters in order to generate a non-linear pattern according to an embodiment of the present invention.

As shown in FIG. 13, in a lens flare generation method according to an embodiment of the present invention, when non-linear patterns are reproduced using a virtual light source, the position, size, and brightness of the non-linear patterns should be readjusted with respect to the virtual light source. Accordingly, non-linear patterns should be generated and stored using the parameters of an actual light source so that upon rendering they may be read and used systemically. Thus, as shown in FIG. 13, a non-linear pattern is generated using two parameters ($\theta,\phi$) and stored. Here, the parameter ($\theta$) is a slope of an incident light ray 1001 with respect to a light axis (Z axis) 1000, and the parameter ($\phi$) is the degree at which the projection of the incident light ray 1001 to the incident plane 1002 rotates about the light axis. As such, in case non-linear patterns are generated for all light directions using the two parameters ($\theta,\phi$), the capacity of a storage medium for recording lens flare images is significantly increased. An image/video compression technique may need to be used together in order to store the images without quality deterioration of the storage medium.

Hence, in order to address the significant increase in the storage medium capacity, only the parameter ($\theta$), which is a slope of the light ray 1001 with respect to the light axis 1000, is used to generate a non-linear pattern as shown in FIG. 14. In other words, the lens flare generation apparatus includes a spherical lens or a non-spherical lens that is mostly shaped as a circle that is symmetrical with respect to the light axis. In light of this, upon generating non-linear patterns, the parameter ($\phi$) may be omitted, and $\phi$ for a virtual light source may be used for rotation upon subsequent reproduction of non-linear patterns, so that the quality deterioration of storage medium occurring as shown in FIG. 13 may be eliminated while offering a similar result.

Arrange Lens Flare Patterns

Figure 15:
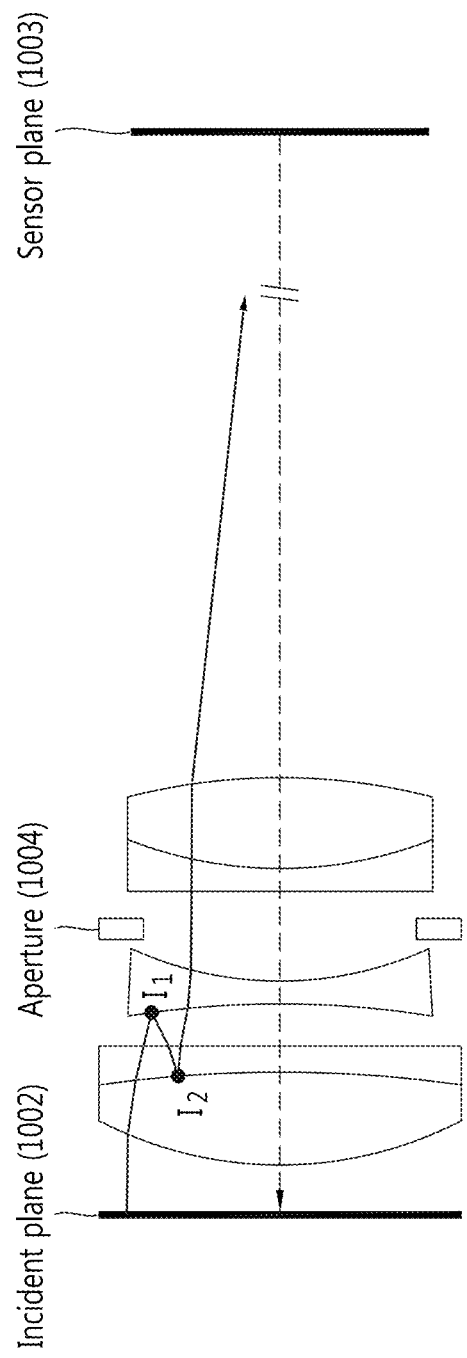
FIG. 15 is a view illustrating an example ghost generated in a lens flare generation apparatus according to an embodiment of the present invention.

FIG. 15 is a view illustrating an example ghost generated in a lens flare generation apparatus according to an embodiment of the present invention.

As shown in FIG. 15, an even number of reflection patterns should be generated to generate a lens flare in a lens flare generation apparatus according to an embodiment of the present invention. In case an odd number of reflection patterns are generated, an incident light ray is coming back to the incident plane 1002 and thus fails to reach the sensor. Accordingly, in order to render a lens flare, a process is required of discovering an even number of combinations of interfaces where reflection may occur in lenses in an optical system. Patterns formed by such an even number of combinations are called ghosts. A lens flare rendering result image generated finally is created by blending the ghosts generated by all of the even number of combinations. FIG. 15 shows an example where two reflections occur to generate one ghost in such manner. For example, a light ray incident through the incident plane 1002 is reflected at interface $I_1$ to the interface $I_2$ while undergoing a displacement, and is then reflected at the interface $I_2$ and goes through a displacement, and reaches the sensor plane 1003 via the aperture 1004.

Generate (Record) Non-Linear Lens Flare

A lens flare generation method according to an embodiment of the present invention may select only non-linear pattern ghosts by performing simulation and may separate render the non-linear pattern ghosts. In other words, each non-linear pattern may be generated for an even number of combinations (i.e., one ghost pattern) of creating reflection of each lens. Such rendering result is rendered per angle of an incident light ray, so that a non-linear pattern result image may be in the form of a look-up table having angles of incident light rays as parameters.

Figure 16:
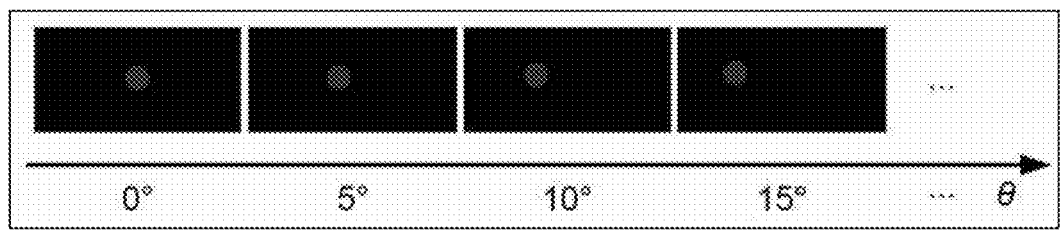
FIG. 16 is a view illustrating an example look-up table according to an embodiment of the present invention.

As an example, a look-up table recording one ghost that is generated using, as parameters, only an angle $\theta$ at which the incident light ray is inclined with respect to a light axis has the form shown in FIG. 16. As shown in FIG. 16, simulation for changing parameter ($\theta$) to 0°, 5°, 10°, and 15° is performed to generate each non-linear pattern result image and to store the non-linear pattern result image in the look-up table.

Figure 17:
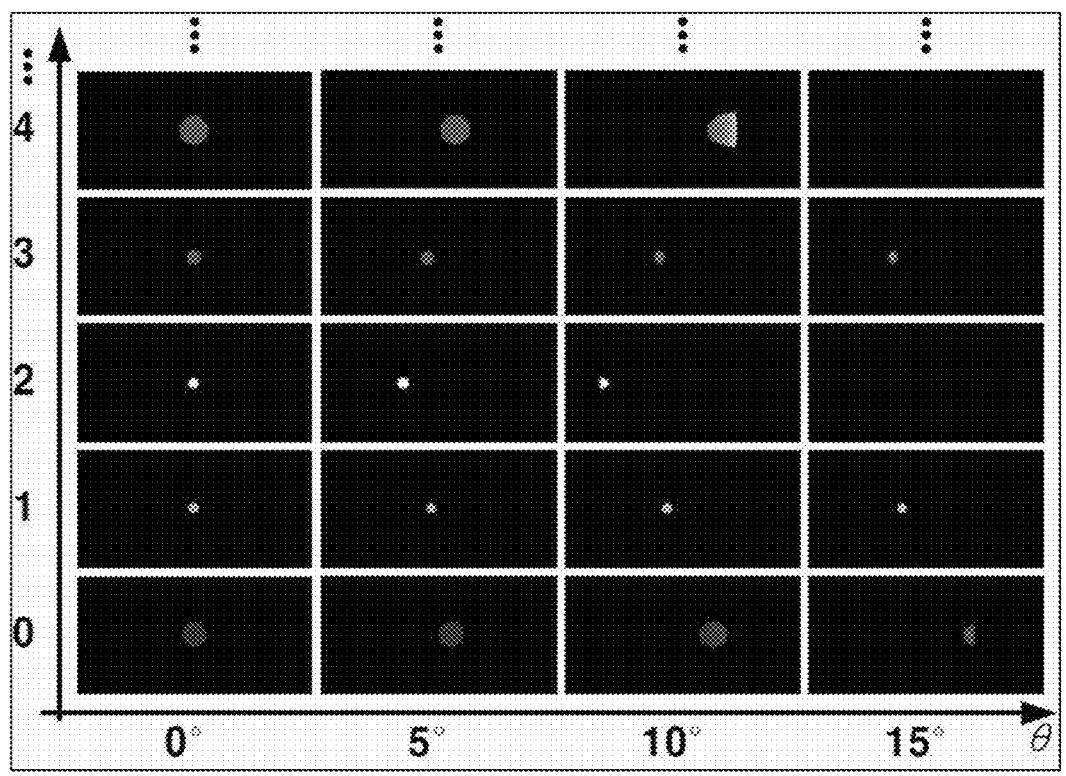
FIG. 17 is a view illustrating an example look-up table according to another embodiment of the present invention.

As another example, non-linear patterns for all ghosts may be separately generated. That is, the look-up table recording all the ghosts that are generated using as parameters only angle θ at which the incident light ray is inclined with respect to the light axis is in the form of a 2D look-up table as shown in FIG. 17. As shown in FIG. 17, simulation for changing parameter (θ) to 0°, 5°, 10°, and 15° per ghost is conducted to generate each non-linear pattern result image and to store the generated result image in a 2D-type look-up table.

Figure 18:
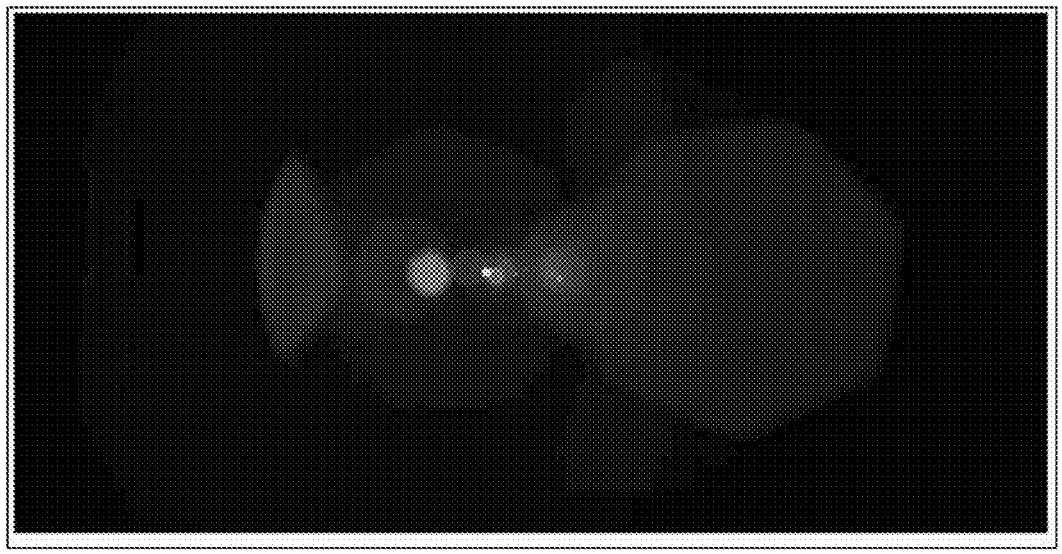
FIG. 18 is a view illustrating an example look-up table according to still another embodiment of the present invention.

Meanwhile, like generating non-linear patterns through the above-described simulation, an actual camera may be used to generate non-linear patterns. However, in case a non-linear pattern is generated using an actual camera, images for reflection combinations causing lens flares are difficult to separately split, and thus, a general method of storing combinations causing reflection into one sheet of image is put to use. An example cell of a look-up table generated using an actual camera is shown in FIG. 18. As shown in FIG. 18, a non-linear pattern generated using the actual camera includes an image of the light source itself in the result unlike a non-linear pattern generated through the above-described simulation. For such reasons, the look-up table is in the form of a 1D look-up table that combines all the ghosts and light source as shown in FIG. 18. As such, generating a non-linear pattern using the actual camera utilizes an actual captured image, thus maximizing reality. However, a process for changing the shape of the ghost or light source afterwards may be required.

Reproduce Non-Linear Lens Flare

Reproduction of non-linear lens flares according to an embodiment of the present invention is divided into a method of using a linear pattern and a method of not using a linear pattern.

First, using a linear pattern is to reproduce a lens flare using a linear pattern generated through linear paraxial approximation-based lens flare rendering or blending a non-linear pattern with a linear pattern based on a texture sprite manually generated. Blending performed according to an embodiment of the present invention is primarily to use additive blending that adds a linear pattern to a non-linear pattern, but according to applications, the blending may use linear/non-linear interpolation for generation. To facilitate such blending, a separate image may be used or an alpha channel of the image may be utilized to do blending.

Specifically, a lens flare generation apparatus represents a virtual light source with parameters similar to the scheme of representing an actual light source with parameters as shown in FIGS. 13 and 14. That is, the lens flare generation apparatus designates a parameter θ indicating a slope at which a virtual incident light ray is inclined with respect to a light axis and a parameter φ indicating an angle at which a virtual light source rotates with respect to an incident plane (perpendicular to the light axis). In this case, θ is a parameter for reading at least one desired non-linear pattern of pre-recorded non-linear patterns out of the look-up table. The non-linear pattern read out by the parameter (θ) is rotated about the light axis based on the parameter (φ) and is thus generated as an image fitting for the current virtual light source. Before blending a linear pattern and a non-linear pattern, the non-linear pattern may be designated for its size (scale) or brightness by a user so that it may be corrected similar to the linear pattern.

Figure 19:
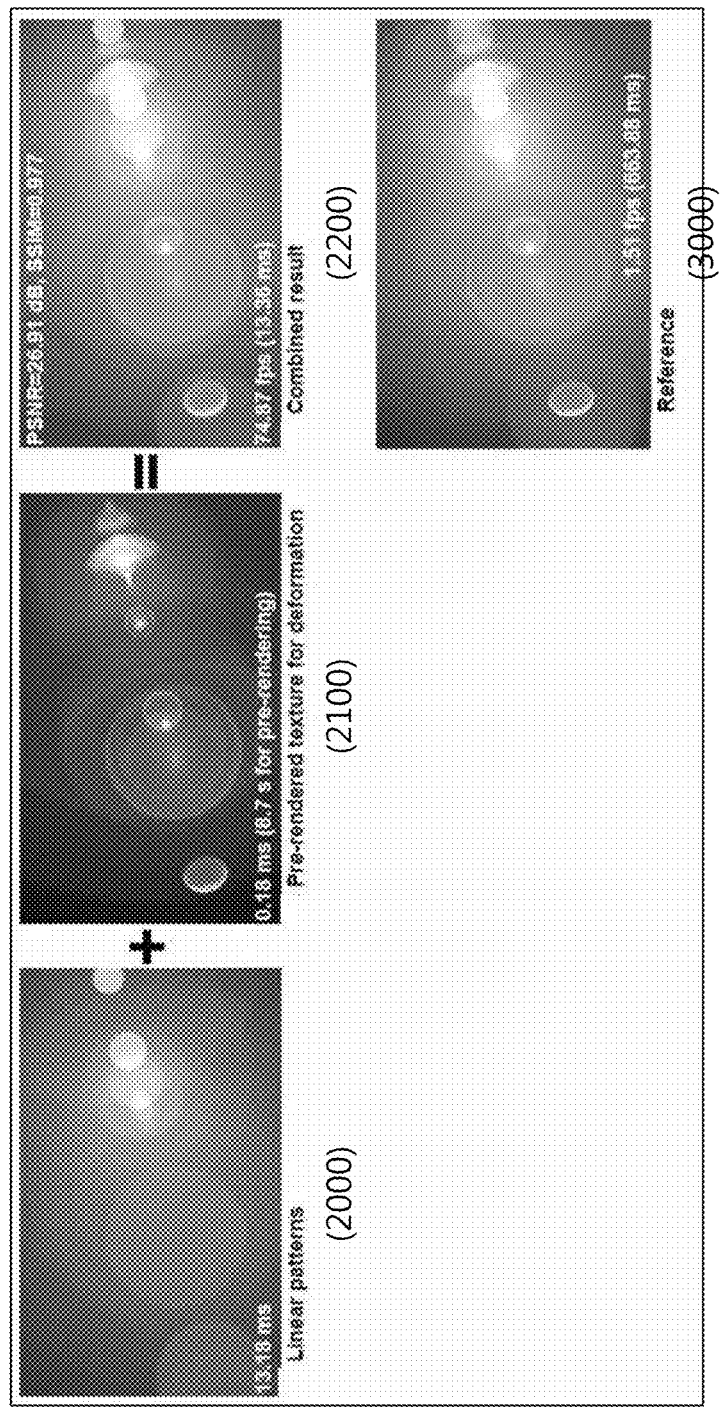
FIG. 19 is a view illustrating an example lens flare generated by blending a linear pattern and a non-linear pattern according to an embodiment of the present invention.

The lens flare generation apparatus blends the non-linear pattern 2100 and the linear pattern 2000 that are read out of the look-up table using the parameter (θ) and then rotated based on the parameter (φ) to generate a final combined lens flare 2200 as shown in FIG. 19. For example, as shown in FIG. 19, the lens flare generation apparatus generates a combined lens flare 2200 result by rendering the linear pattern 2000 generated through a linear paraxial approximation-based rendering method and the non-linear pattern 2100 pre-stored in the look-up table. From a comparison between the combined lens flare 2200 generated thusly with a typical lens flare 3000 obtained by simulating linear/non-liner patterns on the entire optical system without blending shows, it can be seen through PNSR (peak signal to noise ratio) and SSIM values that there is just very small eye-noticeable difference between the combined lens flare 2200 and the typical lens flare 3000. Here, if the PNSR value of the combined lens flare 2200 is 26.91 dB or more, it denotes that the eye-noticeable difference is tiny, and if the SSIM value is "0.977," it denotes that there is no difference.

As such, an example of generating a combined lens flare may be executed by a method of adding a non-linear pattern to rendering software for generating a lens flare as described above. In other words, reality may be increased by adding only a non-linear pattern to a lens flare including an already generated linear pattern. As another example, a non-linear pattern may be generated by a method of actually taking a picture of a lens flare with a camera and drawing the same along a virtual light source, thus creating a combined lens flare including a linear pattern and a non-linear pattern. At this time, the degree of freedom of the subsequent process may be slightly reduced (that is, only the overall size and brightness may be adjusted), but its reality may be maximized because a result from an actual light source is used.

Meanwhile, a method of not using a linear pattern upon reproducing a non-linear lens flare may reproduce a non-linear lens flare using a result of recording all the non-linear patterns with respect to an angle at which the lens flare is inclined with respect to the incident light ray and the light axis using an actual camera.

As described above, a method of rendering a lens flare including a linear pattern and a non-linear pattern according to an embodiment of the present invention uses a non-linear pattern pre-stored in a look-up table to generate a non-linear pattern at higher speed as compared with generation through a physical optical simulation. Further, since a non-linear pattern is stored in the look-up table in the form of an image or video, the non-linear pattern may be simply read out of the look-up table and may be changed only for its size, position, and brightness and may be then used. Accordingly, as compared with the conventional methods, the load may be significantly reduced, thus rendering it appropriate for a high-performance non-linear lens flare rendering method.

Figure 20:
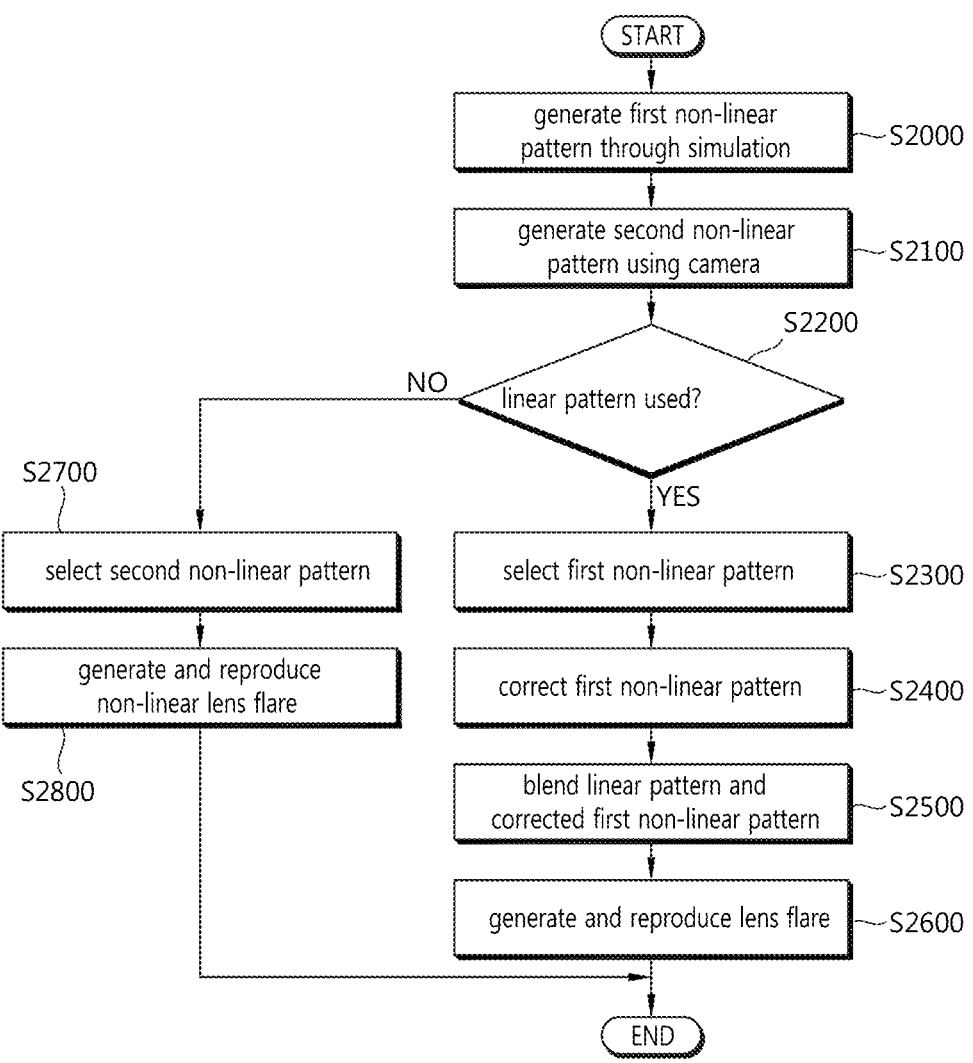
FIG. 20 is a flowchart illustrating a lens flare rendering method according to an embodiment of the present invention.

FIG. 20 is a flowchart illustrating a lens flare rendering method according to an embodiment of the present invention.

As shown in FIG. 20, the lens flare generation apparatus according to an embodiment of the present invention classifies only non-linear pattern ghosts using the parameter (θ) that is an angle at which a incident light ray is inclined with respect to a light axis of two parameters (θ,φ) of an actual light source incident onto an incident plane in order to generate a non-linear pattern through simulation (S2000). The lens flare generation apparatus then generates a first non-linear pattern while varying the parameter (θ) for an even number of combinations (i.e., one ghost pattern) causing lens reflection and stores the generated first non-linear pattern in a look-up table (refer to FIG. 16). Or, the lens flare generation apparatus generates a first non-linear pattern while varying the parameter (θ) per ghost for all ghost patterns and stores the first non-linear pattern in a 2D look-up table (refer to FIG. 17) (S2100). It is assumed in connection with FIG. 20 that the first non-linear pattern is generated while varying the parameter θ alone. Meanwhile, the lens flare generation apparatus generates a second non-linear pattern using a picture and/or video entirely captured relative to the incident light ray and light axis using an actual camera and stores the second non-linear pattern in the form of a 1D look-up table (refer to FIG. 18).

The lens flare generation apparatus determines whether to use a linear pattern upon reproducing a lens flare (S2200).

In case it is determined in step S2200 that a linear pattern is used, the lens flare generation apparatus selects at least one non-linear pattern of the first non-linear patterns stored in the look-up table using the parameter θ (S2300). The lens flare generation apparatus corrects the at least one non-linear pattern selected from the look-up table based on the parameter ϕ indicating the angle at which the virtual light source rotates with respect to the incident plane to fit for the current virtual light source by rotating the selected non-linear pattern about the light source (S2400).

The lens flare generation apparatus blends the corrected at least one non-linear pattern and the linear pattern (S2500) to thus generate a final combined lens flare and reproduces the final combined lens flare (S2600). At this time, the linear pattern may be generated through linear paraxial approximation-based lens flare rendering or based on a manually generated texture sprite.

Meanwhile, in case it is determined in step S2200 that no linear pattern is used, the lens flare generation apparatus selects a second non-linear pattern stored in the look-up table (S2700). The lens flare generation apparatus generates a non-linear lens flare using the second non-linear pattern and reproduces the non-linear lens flare (S2800).

Figure 21:
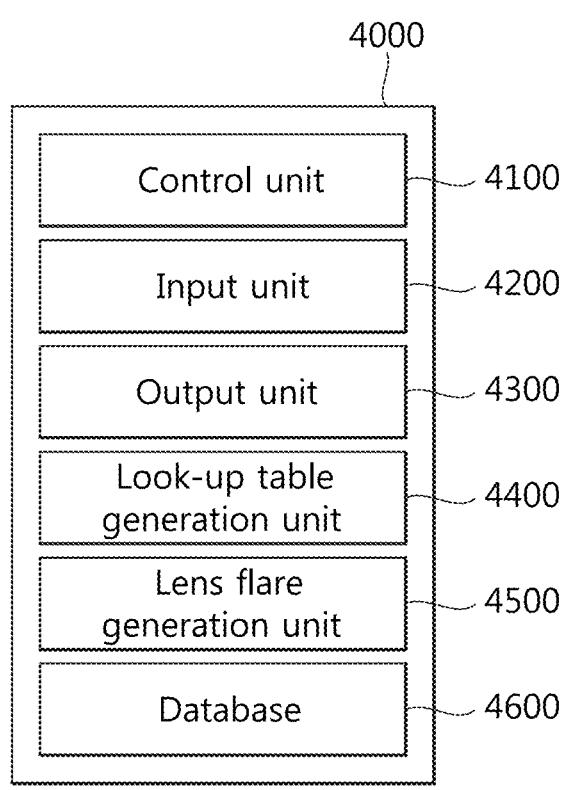
FIG. 21 is a view schematically illustrating a lens flare generation apparatus according to an embodiment of the present invention.

FIG. 21 is a view schematically illustrating a lens flare generation apparatus according to another embodiment of the present invention.

As shown in FIG. 21, the lens flare generation apparatus 4000 according to an embodiment of the present invention includes a Control unit 4100, an input unit 4200, an output unit 4300, a look-up table generation unit 4400, a lens flare generation unit 4500, and a database 4600.

The Control unit 4100 controls the input unit 4200, the output unit 4300, the look-up table generation unit 4400, the lens flare generation unit 4500, and the database 4600. The input unit 4200 receives information necessary to practice an embodiment of the present invention, such as information on a light ray incident onto an incident plane necessary for non-linear pattern rendering or information of a linear pattern used for reproducing a combined lens flare, together with a user's input manipulation. The output unit 4300 outputs a non-linear pattern look-up table generated according to an embodiment of the present invention or combined lens flare results obtained by rendering non-linear patterns and linear patterns.

The look-up table generation unit 4400 generates a first non-linear pattern through simulation and generates a look-up table containing the same. In other words, the look-up table generation unit 4400 classifies only non-linear pattern ghosts and generates each result image of the first non-linear pattern while varying the parameter θ, which is an angle at which an incident light ray is inclined with respect to a light axis for one ghost and stores the generated result image in the look-up table or generates each first non-linear pattern result image while varying the parameter θ for all the ghosts and stores the result image in the look-up table, and as necessary, provides the same. Meanwhile, the look-up table generation unit 4400 generates a second non-linear pattern using a video and/or video entirely captured on an angle between the incident light ray and the light axis by an actual camera, stores the generated second non-linear pattern in the look-up table, and as necessary, provides the same.

The lens flare generation unit 4500 determines whether to use a linear pattern upon reproduction of a non-linear lens flare. In case a linear pattern is determined to be used, the lens flare generation unit 4500 selects at least one non-linear pattern among the first non-linear patterns stored in the look-up table using the parameter θ. The lens flare generation unit 4500 rotates—i.e., rearranges—the selected at least one non-linear pattern based on the parameter ϕ to make corrections to fit for the current virtual light source and then generates a combined lens flare through blending with a linear pattern and provides the same. In case a linear pattern is determined not to be used, the lens flare generation unit 4500 selects a second non-linear pattern stored in the look-up table. The lens flare generation unit 4500 generates a non-linear lens flare using the second non-linear pattern stored in the look-up table and reproduces the same.

The Control unit 4100, the input unit 4200, the output unit 4300, and the look-up table generation unit 4400 may be separately configured as a device that previously generates a first non-linear pattern while varying all and/or some of the parameters θ and ϕ and stores the first non-linear pattern in the look-up table or stores a sec and non-linear pattern generated from a picture and/or video by an actual camera in the look-up table. Further, the Control unit 4100, the input unit 4200, the output unit 4300, and the lens flare generation unit 4500 may be configured in a separate device that renders a lens flare to include a non-linear pattern and a linear pattern and/or reproduces a non-linear lens flare. The above-described database 4600 is an optional component used as necessary and may be omitted. Further, the input unit 4200 and the output unit 4300 may also be omitted if necessary.

The foregoing features may be executed in a digital electronic circuit, or computer hardware, firmware, or a combination thereof. The features may be executed by a computer programmed product that is implemented in a storage medium in machine-readable storage device so as to be executed by a programmable processor. The features may be performed by a programmable processor that executes a program of instructions for performing the functions of the above-described implementations that operate over input data to generate outputs. The above-described features may be executed in a programmable system including at least one output device, at least one input device, and at least one programmable processor combined to receive data and instructions from a data storage system and to transmit data and instructions to the data storage system. The computer program includes a set of instructions that may be directly or indirectly used in a computer to operate certain operations on a predetermined result. The computer program may be written in any one of programming languages including compiled or interpreted languages and may be used in any form included as a program independently manipulated or as an appropriate unit for use in a module, subroutine or other computer environment.

Processors appropriate for executing a program of instructions include, for example, either or both of a universal and specific purpose microprocessor and a sole processor, or multi-processors of any type of computer. Further, storage devices appropriate to implement data and computer program instructions for realizing the above-described features include, for example, semiconductor memory devices such as EPROMs, EEPROMS, and flash memory devices; magnetic devices such as internal hard discs and removable discs; opto-magnetic discs; and CD-ROM and DVD-ROM discs and any other forms of non-volatile memories. The processors and memories may be integrated in ASICs (Application-Specific Integrated Circuits) or may be added by ASICs.

Although the present invention has been described in connection with a series of functional blocks, it will be appreciated by those of ordinary skill in the art that the present invention is not limited to the above-described embodiments and the accompanying drawings and rather various changes, modifications, and variations may be made thereto without departing from the scope of the present invention.

The above-described combinations of the embodiments are not limited to the above-described embodiments, and as per implementations and/or as necessary, various forms of combinations as well as the above-described embodiments may be offered.

In the above-described embodiments, the methods are described based on flowcharts including a series of steps or blocks, but the methods are not limited to the order of the steps, and some steps may be performed in a different order or simultaneously with other steps. Further, it may be understood by those skilled in the art that without the steps provided in the flowcharts being excluded from each other, other steps may be added and some of the steps in the flowcharts may be deleted without affecting the scope of the invention.

The above-described embodiments include various aspects of examples. Although all possible combinations of the various aspects cannot be described, it may be recognized by those skilled in the art that other combinations may be made. Accordingly, the present invention includes all other changes, modifications, and variations as belonging to the scope of the appending claims.

What is claimed is:

1. A method of generating information on a projected position, executed by a processor, the method comprising:
generating light path changing information on at least one lens using information on the at least one lens included in a lens system;
generating projected position information to generate a projected position on a sensor corresponding to a light ray incident position of the lens system using the light path changing information; and
generating a lens flare using the projected position on the sensor,
wherein the light path changing information is a virtual light path conversion equation or matrix multiplication for the at least one lens, and wherein the virtual light path conversion equation or the matrix multiplication performs at least first order approximation on a light path with respect to a light axis of the at least one lens.

2. The method of claim 1, wherein the lens information comprises at least one of a refractive index or a radius of the lens.

3. The method of claim 1, wherein generating the projected position information comprises computing, according to an order of at least one of the at least one lens over a path along which a light ray is transmitted, the light path changing information for the lens along the path where the light ray is transmitted, wherein the path comprises at least one of the at least one lens.

4. The method of claim 3, wherein the path along which the light ray is transmitted comprises a path along which the light ray is reflected by the lens.

5. A lens flare generation method performed by a lens flare generation apparatus, the method comprising:
generating, using a processor, a projected position on a sensor corresponding to an incident position of a light ray using projected position information and the incident position of the at least one light ray incident on an incident plane; and
generating, using the processor, a lens flare using the projected position on the sensor by determining a size of a sprite using at least two projected positions on the sensor corresponding to the incident position of the light ray on the incident plane.

6. The lens flare generation method of claim 5, wherein generating the lens flare using the projected position on the sensor comprises determining at least one of a position or a size of a sprite using projected positions of a first light ray or a second light ray on the sensor, the first light ray corresponding to a center of a region of an incident light ray incident on the incident plane, and the second light ray incident on a position farthest from the first light ray in the region of the incident light ray incident on the incident plane.

7. The lens flare generation method of claim 5, wherein determining whether the incident position of the at least one light ray incident on the incident plane determines incident positions of at least two light rays, wherein generating the lens flare using the projected position on the sensor comprises:
determining an incident area of the incident light ray using two incident positions of the light ray on the incident plane;
determining a size of a projected area on the sensor using two projected positions on the sensor corresponding to the two incident positions; and
determining a brightness of the lens flare using a ratio of the incident area and the projected area.

8. The lens flare generation method of claim 5, wherein determining the incident position of the at least one light ray incident on the incident plane comprises determining a valid incident region where a light ray may pass through an aperture and arrive at the sensor using shape information of the aperture and of the projected position information.

9. The lens flare generation method of claim 5, wherein generating the lens flare using the projected position on the sensor comprises generating the lens flare using shape information of an aperture.

10. A lens flare generation apparatus, comprising:
a processor configured to:
generate light path changing information on at least one of the at least one lens using information on the at least one lens included in a lens system,
generate projected position information to generate a projected position on a sensor corresponding to a light ray incident position of the lens system using the light path changing information, and
generate a lens flare using the projected position on the sensor,
wherein the light path changing information is a virtual light path conversion equation or matrix multiplication for the at least one lens, and wherein the virtual light path conversion equation or the matrix multiplication performs at least first order approximation on a light path with respect to a light axis of the at least one lens.

11. The lens flare generation apparatus of claim 10, wherein the processor comprises a calculating unit configured to:

generate the light path changing information on the at least one of the at least one lens using the information on the at least one lens included in the lens system; and generate the projected position information to generate the projected position on the sensor corresponding to the light ray incident position of the lens system using the light path changing information.

12. The lens flare generation apparatus of claim 11, wherein the information on the lens comprises at least one of a refractive index or radius of the lens.

13. The lens flare generation apparatus of claim 11, wherein the calculating unit is further configured to compute the light path changing information on the lens along a path where a light ray is transmitted, the path comprising at least one of the at least one lens, according to an order of the at least one lens over the path along which the light ray is transmitted to generate projected position information.

14. The lens flare generation apparatus of claim 13, wherein the path along which the light ray is transmitted comprises a path along which the light ray is reflected by the lens.

15. A lens flare generation apparatus, comprising:
a processor configured to:
generate a projected position on a sensor corresponding to an incident position of a light ray using projected position information and the incident position of the at least one light ray incident on an incident plane, and
generate a lens flare using the projected position on the sensor,
wherein the renderer is further configured to determine a size of a sprite using at least two projected positions on the sensor corresponding to the incident position of the light ray on the incident plane.

16. The lens flare generation apparatus of claim 15, wherein a receiver is configured to determine a valid incident region where a light ray may pass through an aperture and arrive at the sensor using shape information of the aperture and of the projected position information.

17. The lens flare generation apparatus of claim 15, wherein the processor comprises a rendering unit configured to:
generate the projected position on the sensor corresponding to the incident position of the light ray using the projected position information and the incident position of the at least one light ray incident on the incident plane, and
generate the lens flare using the projected position on the sensor.

18. The lens flare generation apparatus of claim 17, wherein the rendering unit is further configured to determine at least one of a position or size of a sprite using projected positions of a first light ray and a second light ray on the sensor, the first light ray corresponding to a center of a region of an incident light ray incident on the incident plane, and the second light ray incident on a position farthest from the first light ray in the region of the incident light ray incident on the incident plane.

19. The lens flare generation apparatus of claim 17, wherein the rendering unit is further configured to determine an incident area of an incident light ray using incident positions of at least two light rays of the at least one light ray on the incident plane, to determine a size of a projected area where the two light rays are projected on the sensor using positions on the sensor corresponding to incident positions of the two light rays on the incident plane, and to determine a brightness of the lens flare using a ration of the determined incident area and the determined projected area.

20. The lens flare generation apparatus of claim 17, wherein the rendering unit is further configured to generate the lens flare shaped as the aperture using the shape information of the aperture.

* * * * *